(12) United States Patent
Vogel et al.

(10) Patent No.: US 11,739,016 B2
(45) Date of Patent: Aug. 29, 2023

(54) AUTOMATED ZERO WASTE SYSTEMS AND METHODS

(71) Applicant: 3D Renewables, LLC, San Carolos, CA (US)

(72) Inventors: William S. Vogel, San Carlos, CA (US); Raymond Thomas Hines, Castro Valley, CA (US)

(73) Assignee: 3D Renewables, LLC, San Carolos (CA)

( * ) Notice: Subject to any disclaimer, the term of this patent is extended or adjusted under 35 U.S.C. 154(b) by 715 days.

(21) Appl. No.: 16/598,710

(22) Filed: Oct. 10, 2019

(65) Prior Publication Data

US 2020/0115264 A1 Apr. 16, 2020

Related U.S. Application Data

(60) Provisional application No. 62/743,870, filed on Oct. 10, 2018.

(51) Int. Cl.
*C02F 9/00* (2023.01)
*B01D 21/24* (2006.01)
*C02F 3/12* (2023.01)
*C05F 7/00* (2006.01)
(Continued)

(52) U.S. Cl.
CPC ............. *C02F 9/00* (2013.01); *A01C 23/007* (2013.01); *A01C 23/008* (2013.01); *B01D 21/24* (2013.01);
(Continued)

(58) Field of Classification Search
CPC ........ C02F 9/00; C02F 11/04; C02F 2103/20; C02F 3/28; B01D 21/00; B01D 21/10
(Continued)

(56) References Cited

U.S. PATENT DOCUMENTS

| 4,663,038 A | 5/1987 | Smith et al. |
| 6,245,121 B1 * | 6/2001 | Lamy ........................ C02F 9/00 71/21 |

(Continued)

FOREIGN PATENT DOCUMENTS

| EP | 1134323 A2 | 9/2001 |
| EP | 1815900 A2 * | 8/2007 ......... B01D 17/0205 |

OTHER PUBLICATIONS

International Search Report, PCT Application No. PCT/US19/55698, Application Filing Date Oct. 10, 2019, dated Feb. 10, 2020.

*Primary Examiner* — Claire A Norris
(74) *Attorney, Agent, or Firm* — Kramer Levin Naftalis & Frankel LLP

(57) ABSTRACT

Systems and methods for employment in a Zero Waste (ZW) treatment system are disclosed. The ZW treatment system includes a ZW process employing the following individual processes: a separation and extraction process, a blend-heat process, a hydrolysis and acidification process, first-in, first-out (FIFO) anaerobic digestion process, an aerobic boost-blend process, and smart delivery process. A separation and extraction system, a blend-heat system, hydrolysis and acidification system, and a FIFO system performing the ZW treatment process may include a variety of tanks, where each tank may be placed in an enclosure comprising a modular container which, in turn, comprises a modular container system designed for mobility and transportable to remote sites as part of the smart delivery process.

6 Claims, 16 Drawing Sheets

(51) Int. Cl.
    *A01C 23/00*     (2006.01)
    *C05F 17/40*     (2020.01)
    *C05F 17/60*     (2020.01)
    *C05F 17/95*     (2020.01)
    *C02F 1/66*     (2023.01)
    *C02F 1/00*     (2023.01)
    *C02F 3/28*     (2023.01)

(52) U.S. Cl.
    CPC .............. *C05F 7/005* (2013.01); *C05F 17/40* (2020.01); *C05F 17/60* (2020.01); *C05F 17/95* (2020.01); *C02F 1/66* (2013.01); *C02F 3/12* (2013.01); *C02F 3/28* (2013.01); *C02F 2001/007* (2013.01)

(58) Field of Classification Search
    USPC ...................................... 210/195.1, 607, 252
    See application file for complete search history.

(56) References Cited

U.S. PATENT DOCUMENTS

| | | | |
|---|---|---|---|
| 6,299,774 B1 * | 10/2001 | Ainsworth | ............. C12M 47/20 |
| | | | 210/603 |
| 2004/0164019 A1 * | 8/2004 | Fassbender | ............... C02F 1/02 |
| | | | 210/603 |
| 2010/0282654 A1 | 11/2010 | Hauschild | |
| 2011/0168611 A1 | 7/2011 | Early et al. | |
| 2012/0012189 A1 | 1/2012 | Janson et al. | |
| 2014/0034573 A1 | 2/2014 | Liu et al. | |
| 2014/0061106 A1 | 3/2014 | Knoop | |
| 2015/0111271 A1 | 4/2015 | Josse et al. | |
| 2016/0297724 A1 | 10/2016 | Green | |
| 2016/0369303 A1 | 12/2016 | Brunner | |
| 2017/0137331 A1 | 5/2017 | Charreyre | |

\* cited by examiner

210

212

AUTOMATED ZERO WASTE SYSTEMS AND METHODS

BACKGROUND

Many Zero-Waste (ZW) treatment projects are fee-based community sites with on-site personnel that receive and organize ad-hoc deliveries, directing materials to one or more treatment areas. This model does not apply to waste at agricultural, commercial and industrial locations—which constitute 100 s of times the volume of municipal sources. Regulations designed to avoid specific forms of pollution have been created, reducing farm income and food production per acre.

At the risk of oversimplifying, a majority of existing farm waste management systems focus on (a) inflexible methods of treating bulky materials using a partial process for limited forms and types of waste streams, (b) reducing methane emissions using anaerobic digesters as containment vessels that capture biogas, and (c) finding use for bulky biosolids, spreading massive volumes of lagoon water across acreage to comply with groundwater regulations. Some bulk biogas production projects at farms use low intensity methane capture methods such as, for example, covering lagoons with massive tarps that accumulate biogas and hold materials for lengthy periods, thereafter leaving huge volumes of residual solids and fluids that are difficult to use and impractical to export as fertilizer. With respect to precise organic farming and its objectives, finding uses for mixed materials with random content and low quality could be at odds.

In contrast, automated ZW systems serve acute needs to convert agribusiness and industrial byproducts into high-volume, high-quality resources that avoid fossil fuels and improve farm productivity. Automated ZW systems may be integrated subsystems that convert organic materials from voluminous sources of agricultural and industrial waste into safe and usable fluids-solids-energy which may be critical to avoiding pollution, enabling organic farming, expanding renewable fuels and reducing the burden of complex compliance rules on agricultural and industrial operators. One goal of ZW is an elimination of pollution by producing precise coproducts that could be more beneficial and marketable than existing alternatives for bioenergy and biofertilizers. A ZW project may place an emphasis on specific forms of renewable energy, specific markets for organics, natural chemicals and/or remediation services for organic waste streams are made up of water, volatile organic solids, liquefied biochemicals and inorganic materials. To address these issues, modular-configurable-controllable subsystems that treat wastewater, solid and liquefied sources of agricultural and industrial byproducts may be developed to meet a core need.

The rate of waste-based project development is slow with a spotty operating history, a low return on investment and a high-incidence of project failures that inhibit could investment. Projects may be inflexible with respect to business growth and contraction. Project designs may be structured around one site's waste rather than networks of remediation-based services. As such, society's interest in reducing pollution may not be served by scalable-repeatable development. With respect to new advancements in (a) Variable flows with complex constituents and problematic materials; (b) Variable solid waste with seasonal availability of crop residues, rejects and food preparation materials; (c) Multiple forms of incompatible equipment that are difficult to integrate and operate; (d) High-incidence of downtime from digester failure with extended maintenance for cleaning up vessels; (e) Configuring and synchronizing the above variables in a continuous process flow (f) Construction-intensive integration that inhibits project development and modular expansion; (g) High capital cost from custom configurations of disparate assets to variable flow rates and composition; (h) Lack of standards for integrating and operating multi-function waste management; (i) In ability to support variable treatment methods on diverse recipe content for biofertilizer production; and (j) Waste-based development involves custom design with multiple forms of construction and integration.

One problem is the wide diversity and geographically dispersed nature of organic byproduct sources, such as, but not limited to, livestock manure and livestock food byproducts, crop residues and rejects, food packing waste, food and beverage production byproducts, food distribution rejects, institutional food waste, mining, fuel extraction and fuel production. These sources and factors constitute pernicious forms of waste for which cost-effective remediation and offer potential sources of bioenergy and bio nutrition that may be required. The volume, location and seasonality of many of these sources do not lend themselves to a fee-based ad-hoc waste services wherein remote waste is delivered to geographically limited availability of sustainable disposal processing sites and partial treatment assets that are dedicated to specific types of waste, customized around narrow tolerances of treatment, based on static concepts of remediation or production. For instance, livestock operators could experience changes in manure rates per cow, herd size and water volume changes. At different periods during the year, dairy operators may allow grazing which reduces manure volume per cow, since cows leave manure in the field, yet increase volume at other periods when keeping cows in barns. High-volume dairy operations could use more or less water throughout the year to move waste and cool animals with spray-misters, increasing water volume per cow. Livestock manure is only one source of material that occurs 24 hours per day 365 days per year. Whereas, diverse crop harvests that produce all manner of crop residues and rejects may occur at different points throughout a year.

Conventional waste management methods and systems may be considered as construction-intensive, highly specialized and inflexible with respect to diversity, volumes and composition of ever-changing sources. Conventional waste management systems are may be considered limited from a project development and integrated operations perspective. Many digester systems are based on waste management principals rather than bioproduction, resulting in significant limitations and challenges that stem from waste-oriented digester development. From an anaerobic systems perspective, ZW may require precise ingredients using precise and adaptive treatment methods, thorough destruction with adaptive control over materials and process. Some farm-based digester systems focus on specific vessel formats, one form of heating, one type of agitation and one method of material migration, to name just a few of the limitations. Advanced food waste and biogas production systems involve, for example, customized projects of temperamental, proprietary assets that are neither cost-effective nor robust and flexible, thus, unable to build, operate, adapt and repeat project development, a critical requirement to scale across regions and industries.

Many methods of waste treatment may be considered as highly specialized around the composition and volume of one waste stream, for instance dilute manure wastewater, sequentially removing or chemically treating materials.

From a ZW perspective, these designs are not general purpose, resulting in capital-intensive, inflexible systems design with strict limits over volumetric, solids concentration, particle size and solids type. Livestock and grower operations produce a wide diversity of solids, fluids, sludge and dry matter.

Many of the challenges with existing digester designs as implemented on US farms as of this writing include the following: (a) low solids operation with high parasitic heat; (b) low volatility per unit of material; (c) low destruction rates combined with disorderly material migration; (d) bulk materials management with limited control over feedstock; (e) single line of digestion (production) that focuses on one large containment vessel; (f) inability to maintain temperatures throughout vessels; (g) extended downtime for excavating settleable solids; (h) feedstock conflicts, insufficient agitation or (alternatively) aggressive mixing; (i) settleable solids jamming agitation equipment; (j) insufficient feed pipe and pumping resulting in slow or clogged loading of digesters; (k) digestion failures from ammonia/pH degradation; (l) dilute organic loads with low energy and nutrient density; (m) limited control over environmental and biochemical conditions; (n) low grade biogas requiring costly cleaning where needed to comply with either air quality, power density and/or biofuel quality standards; (o) low grade digestate that is unable to comply with organic standards without expending additional energy for post digestion pasteurization; (p) customized development challenges wherein scaling decisions result inconsistent performance due to variable design parameters from one application/site to the next application/site; and/or (q) low quality dilute digestate that impedes the operators ability to export nutrients off the farm, for purposes of sale and water contamination compliance.

SUMMARY

Embodiments of the inventive concepts disclosed herein are directed to a zero waste (ZW) treatment system In one aspect, embodiments of the inventive concepts disclosed herein are directed to a zero waste (ZW) treatment system that produces filtered water, bioenergy and biofertilizers; comprising one or more fluidic separation subsystems using stratification-syphoning tanks to enable separation/filtration assets to segment and extract inorganic and organic materials from multiple fluid streams, one or more feedstock pretreatment tank subsystems that convert raw feedstock into treated ingredients, one or more blend-heat-inoculate tank subsystems that integrate-heat ingredients with or without one or more inoculate-hydrolysis tank subsystems, two or more FIFO anaerobic tank subsystems of one or more formats, one or more organic treatment subsystems with or without aerobic integration and one or more formulaic blend-boost subsystems with or without one or more smart delivery subsystems; all subsystems of which control treatment methods and intensity, environmental and biochemical conditions, residence time and routing paths, managed by recipe control logic through facility and enterprise software.

In a further aspect, embodiments of the inventive concepts disclosed herein are directed to a ZW treatment system wherein the feedstocks to be treated is selected from a variety of organic materials, including wastewater, sludge, dry matter, excreted manure, crop residues, silage dust, produce rejects, fats, oils, greases, food waste and other organic materials in such a way that supports multi-feedstock processing with specific treatments for each type of feedstock to achieve specific ingredient requirements of recipe-based production.

In a further aspect, embodiments of the inventive concepts disclosed herein are directed to a ZW treatment system wherein ingredients are selected from a variety of pretreated or received organic materials such as concentrated organic matter from wastewater, pretreated feedstock, biochar, compost, worm castings, nutrient adders, enzymes, compost teas, nitrogen fixing microbial/fungus/absorbent materials and other adders; supporting injection of each type of ingredient or blend of ingredients at one or more stages with the process as well as one or more zones within a digester based on recipe instructions.

In a further aspect, embodiments of the inventive concepts disclosed herein are directed to a ZW treatment system that filters wastewater and treats organic waste to (a) produce high quality, organically certified biofertilizers of multiple formulas, grades and methods of delivery, (b) maximize bioenergy production of high-density biofuels, (d) select chemical byproducts and (d) select biomaterials byproducts.

In a further aspect, embodiments of the inventive concepts disclosed herein are directed to a ZW treatment system that supports multiple reaction temperatures and/or treatment by feedstock, ingredient, stage and/or zone or tank with a stage of treatment to ensure organic and food safety compliance via multiple methods, including; pasteurizing feedstock, ingredients and/or digested materials, subjecting recipe batches to intense anaerobic digestion by employing hybrid temperature digestion with minimum residence time by temperature level and/or specialized forms of material destruction such as hydrothermal cavitation or other steam-assisted injection, sonic destruction, irradiation and/or microwave.

In a further aspect, embodiments of the inventive concepts disclosed herein are directed to a ZW treatment system wherein each of the stages and assets support monitoring and control over environmental, material and/or biochemical parameters of assets, stages and/or multiple tanks and/or zones, feedstock, anaerobic and/or aerobic stage of treatment, including but not limited to tank level, temperature, conductivity, pressure, ammonia, ammonium, nitrate, nitrite, pH, particle size, gas content and composition, solids density, rotation rate, injector pressure, calcium, potassium, phosphorus, chloride and/or flow rates.

In a further aspect, embodiments of the inventive concepts disclosed herein are directed to a ZW treatment system that employs modular units of physical capacity that aggregate multiple types of functional equipment into physical and logical units of controllable capacity as subsystems which are able to be quickly installed (one install to many assets) and/or moved from one location to another for mobile/satellite services and/or repurposing capacity from one site to another.

In a further aspect, embodiments of the inventive concepts disclosed herein are directed to a ZW treatment system that employs standardized, modular container-structures with internal and/or external vessels that can support diverse capacity and functionality options, including; multi-container integration (e.g. peer/parallel, sequential and/or stacking), shipping and crane interfaces, mobility (e.g. wheels/sleds), footings mounts for securing, elevating and/or elevation control, seismic stabilizers, one or more internal mounts/saddles for one or more tanks, air vents and/or HVAC exchange ports, gas relief areas with gas evacuation interfaces, manway access, skid mountings, equipment mountings, cabinets for subsystem controls and other equipment, insulation, environmental controls, internal/external bulkhead manifolds for pipes-hoses-conduits, wire troughs as well as overhead riser mounts for shade, solar and/or other equipment at one or more points of the container with internal routing mounts and connectors for piping, wiring and hoses.

In a further aspect, embodiments of the inventive concepts disclosed herein are directed to a ZW treatment system that supports a variety of vessel formats, shapes and capacities yet employs multi-functional treatment standards to enable shared, dedicate, repurposed and consolidated capacity options into one or more containers using one or more general or dedicated-purpose, multi-processing tanks.

In a further aspect, embodiments of the inventive concepts disclosed herein are directed to a ZW treatment system wherein multiple stages and/or portions of any stage can be located at one or more, fixed or mobile, sites to enable distributed production and distribution supporting hub and spoke sourcing, hub and spoke treatment as well as hub and spoke distribution.

In a further aspect, embodiments of the inventive concepts disclosed herein are directed to a ZW treatment system wherein general purpose, intelligent processing tanks of vertical or horizontal format add multiple processing features in one or more tanks, of various capacities, such that few vessels can operate as one or more functional derivative of stratification tank, blend tank, hydrolysis tank and/or digester tank by ensuring control over flow rates, multi-source inoculation, agitation rates, material migration, pH, temperature, ingredient injection, solid reduction, solids destruction and/or solids concentration.

In a further aspect, embodiments of the inventive concepts disclosed herein are directed to a ZW treatment system that employs a plurality of vertical and/or horizontal digesters in a series of functionally enhanced configurations that ensure retention time with persistent temperature levels, orderly destruction and compliant material injection at one or more points in the anaerobic process in order to maximize biogas while producing digestate that complies organic and food safety standards.

In a further aspect, embodiments of the inventive concepts disclosed herein are directed to a ZW treatment system wherein material concentration, macro to micro particle reduction, multi-source thermal systems, multi-source inoculant exchange and interconnected fluidic jet systems that extract-inject-agitate; working in concert with precise monitoring and control systems to enable high-solids with accelerated destruction rates to maximize bioenergy yield, minimize parasitic energy, and produce a variety of organically-compliant mediums, including ultrafine yet concentrated mediums for micro irrigation delivery.

In a further aspect, embodiments of the inventive concepts disclosed herein are directed to a ZW treatment system that enables hydration and material concentration combined with macro-to-micro particle reduction to enable precise ingredients that can be integrated at one or more points within a distributed process.

In a further aspect, embodiments of the inventive concepts disclosed herein are directed to a ZW treatment system that supports extreme particle size reduction using a variety of techniques, including soaking, grinding, chopping, milling, sonic destruction, steam cavitation, radiation and/or microwave as a means to reduce particle size below 50 microns and destroy cell walls while preserving biological characteristics of each recipe batch by allocating multiple source ingredients to unique forms of treatment and inoculating from multiple downstream sources under recipe control.

In a further aspect, embodiments of the inventive concepts disclosed herein are directed to a ZW treatment system that employs multiple methods of thermal transfer, under process control, using multiple sources of energy to accelerate heating and control energy costs by applying select forms of heating to concentrated feedstocks, treated ingredients and recipe batches, thereby avoiding energy wasted on dilute and/or combined substrates. A thermal treatment system of claim x wherein multi-source heating includes industrial instahot, solar thermal, internal heating coils and heat exchange for preheating from exhaust or digestate with or without supplemental hot water or steam boiler systems.

In a further aspect, embodiments of the inventive concepts disclosed herein are directed to a ZW treatment system wherein blend-heat-inoculate-digest systems, under process control, employ multiple heating methods, internal and/or external, including one or more heating blankets, dimple jackets, internal pipes, heating coils and/or heated fluidic injection all of which are supported by multiple forms of thermal transfer mediums and sources of energy such as electric power, gases, liquid fuels, solar power and/or solar thermal with the ability to simultaneously and/or selectively employ multiple energy forms to enhance cost-performance.

In a further aspect, embodiments of the inventive concepts disclosed herein are directed to a ZW treatment system that enables inoculant exchange from and to multiple points within the process, including aerobic and/or anaerobic, any vessel, stage of treatment, zone within vessel, source of enzyme and/or blend of inoculants to optimize biological activity by recipe under process control a ZW treatment system of claim 1 wherein inoculation can occur at multiple steps within the process and be derived from multiple sources, including multiple stages, batch recipes, zones within digesters and/or dedicated inoculant tanks.

In a further aspect, embodiments of the inventive concepts disclosed herein are directed to a ZW treatment system that monitors material, temperatures and biochemical conditions and employs mechanical and/or fluidic agitation at one or more points within the process with control over agitation rates, direction and internal momentum by stage of treatment as well as zones within vessels.

In a further aspect, embodiments of the inventive concepts disclosed herein are directed to a fluidic injection and agitation system which includes a single or multi circuit assembly; one or more pumps of one or more types including two-way recirculation pumps or other pump; one or more controllable valves; one or more injection points of varied forms and functions including pipe openings, jets, nozzles, venturi mixers, sprayer with or without venturi affect and/or other injection devices; one or more sensor manifolds or chambers; one or more circuits of which connect sampling (in) and injection points (out) to pumps with optional inoculant delivery and/or supply, sonic reduction chambers and/or material injection tanks that supply pH and/or other ingredients.

In a further aspect, embodiments of the inventive concepts disclosed herein are directed to a ZW treatment system wherein the wastewater separation-concentration subsystems adapt to volatile flow rates and variable solids concentration using stratification tanks with variable rate syphoning allocating multiple forms of inorganic and organic material separation/filtration/absorption assets to multiple syphon streams.

In a further aspect, embodiments of the inventive concepts disclosed herein are directed to a wastewater separation system wherein primary feed rates, stratification tank levels, syphon rates by stratification layer within tanks, one or more cyclone feed valves, one or more screens, one or more filtration systems, equipment backwashing cycles, stratification tank jets, tank elevation controls, organic absorption assets, organic holding tanks, and other relevant parameters of diverse equipment options can be controlled by process controls, based on multiple measured parameters.

In a further aspect, embodiments of the inventive concepts disclosed herein are directed to a wastewater treatment system wherein volatile flow rates of high-volume wastewater with variable solids rates as well as sludge and hydrated solids are separated via fast settling and syphoning into multiple streams of secondary treatment using sand removal, hydrocyclone, screens, filtration and other tertiary treatment, thereby producing one or more inorganic, one or more organic extracts and filtered water.

In a further aspect, embodiments of the inventive concepts disclosed herein are directed to a wastewater treatment system wherein each syphon stream can be treated to multiple types and combinations of one or more secondary extraction, separation, filtration, absorption or other techniques, including but not limited to active carbon absorption, biochars absorption, carbon filters, centrifuge, disk filters, hydrocyclones, media filters, membrane filters, screens, fabric filters, filter tanks, disk filters, dissolved active filtration, etc.

In a further aspect, embodiments of the inventive concepts disclosed herein are directed to a wastewater treatment system wherein filtered water can be further treated to multiple tertiary forms of treatment, including activated carbon, charcoal or biochar absorption, media filtration as well as various membrane filtration systems.

In a further aspect, embodiments of the inventive concepts disclosed herein are directed to a wastewater treatment system wherein organic extracts are stored in general purpose holding tanks that agitate, concentrate, combine, reduce particles and/or preheat substrates for interfacing to downstream systems.

In a further aspect, embodiments of the inventive concepts disclosed herein are directed to a ZW treatment system wherein the feedstock pretreatment subsystems receive-store-convey diverse materials, apply multiple methods of material treatment to raw materials, including; composting, extracting, vermicomposting, soaking, hopping, milling, micro particle destruction and/or other specialized method; the sequence, intensity and retention of which are based on the type of feedstock and recipe requirements.

In a further aspect, embodiments of the inventive concepts disclosed herein are directed to a feedstock logistics and pretreatment system wherein one or more hoppers, one or more routing paths, one or more specialized treatment assets and two or more recipe holding tanks are managed by process control systems.

In a further aspect, embodiments of the inventive concepts disclosed herein are directed to a feedstock logistics and pretreatment system that can reduce particle size and destroy cell walls via multiple progressive methods including grinding, soaking, chopping, milling and/or micro particle destruction, the sequence, intensity and retention of which are based on the type of feedstock and recipe requirements.

In a further aspect, embodiments of the inventive concepts disclosed herein are directed to a feedstock logistics and pretreatment system wherein sonic destruction, high performance pumps, fluidic agitation and post-loading fluidic injection enable high solids concentration within anaerobic loading and retention under recipe process control.

In a further aspect, embodiments of the inventive concepts disclosed herein are directed to a ZW treatment system wherein blend-heat-inoculate subsystems integrate precise ingredients and employ multiple forms of heating using multiple source of energy with or without micro particle destruction in order to accelerate preparation and digestion while control energy costs.

In a further aspect, embodiments of the inventive concepts disclosed herein are directed to a blend-heat-inoculate system that uses a uses multiple, multiple forms of thermal transfer and heat sources in a variety of vessel formats, including vertical and horizontal tanks of various capacities and shapes.

In a further aspect, embodiments of the inventive concepts disclosed herein are directed to a vertical blend-heat tank system that uses external, internal and/or direct heating, combined with fluidic thermal injection and agitation by zone to ensure consistent temperature control across many sizes and shapes of vertical vessel formats.

In a further aspect, embodiments of the inventive concepts disclosed herein are directed to a horizontal blend-heat tank system that uses multiple, length-wise sub-vessel heat blankets and/or internal heat blankets or pipes, combined with fluidic thermal injection and agitation by zone to ensure consistent temperature control across many sizes and shapes of horizontal vessel formats.

In a further aspect, embodiments of the inventive concepts disclosed herein are directed to a ZW treatment system wherein multipurpose inoculate-heat-agitate tanks subsystems can avoid or extend residence time for hydrolysis-acidification-methanization by recipe in order to optimize capacity and enhance performance under routing control.

In a further aspect, embodiments of the inventive concepts disclosed herein are directed to a hydrolysis-acidification tank system wherein sources of inoculation include previous batch and/or peer hydrolysis tanks, digester zones, digestate, enzymes and/or inoculant blend tanks.

In a further aspect, embodiments of the inventive concepts disclosed herein are directed to a hydrolysis-acidification tank system wherein control over inoculation rate, inoculant content, temperature, pH, ammonia, agitation, and other relevant parameters are managed per recipe instructions which include event-threshold driven process logic that asuage hydrolysis and acidification process, based on real time data and objective criteria.

In a further aspect, embodiments of the inventive concepts disclosed herein are directed to a ZW treatment system wherein inoculation can occur at multiple steps within the process and be derived from multiple sources, including multiple stages, batch recipes, zones within digesters and/or dedicated inoculant tanks.

In a further aspect, embodiments of the inventive concepts disclosed herein are directed to a hydrolysis-acidification tank system wherein retention management and functionality can facilitate acetogenesis and methanization as needed to manage capacity, for instance, permanent or temporary repurposing of vessel capacity to increase through put.

In a further aspect, embodiments of the inventive concepts disclosed herein are directed to a hydrolysis-acidification tank system wherein fluidic injection is employed in order to boost biohydrogen, biomethane and/or carbon dioxide production by metering in pretreated carbohydratelipids-proteins-other materials, injected at one or more fluidic injection zones within a digester, yet comply with material, time and retention requirements of organic and food safety restrictions.

In a further aspect, embodiments of the inventive concepts disclosed herein are directed to a ZW treatment system of claim 1 wherein high-solids, first-in, first-out anaerobic digestion tank subsystems process organic loads of decreased particle size yet increased solids concentration; feeding digesers using combinations of high performance pumps for loading micro particle recipes, fluidic control of environmental and biochemical conditions within digesters, zonal heat injection with or without sonic destruction, pH injection, inoculant extraction and new solids injection and/or post-loading ingredient injection in order to optimize performance per recipe instructions.

In a further aspect, embodiments of the inventive concepts disclosed herein are directed to a FIFO digestion subsystem of claim X that employs a plurality of tank formats using controllable agitation, multi-location heating, plug flow and/or multi-tank configurations that ensure orderly material migration with minimum temperature and time, necessary to comply with organic and food safety standards.

In a further aspect, embodiments of the inventive concepts disclosed herein are directed to a ZW treatment system of claim x wherein FIFO digestion vessels employ combinations of sub-vessel, internal and fluidic injection heating, with or without mechanical agitation, with or without material injection, with or without baffles, to ensure precise temperature and material migration along horizontal vessels of various sizes and shapes.

In a further aspect, embodiments of the inventive concepts disclosed herein are directed to a FIFO digestion subsystem of claim y wherein zones are defined by the fluidic system design rather than baffles.

In a further aspect, embodiments of the inventive concepts disclosed herein are directed to a FIFO digestion system that uses horizontal digesters using intelligently controlled, fluidic agitation, with or without mechanical assist, that maintains plug flow integrity using zonal jet controls, with or without baffles, supported by inoculant and heated material injection at one or more zones.

In a further aspect, embodiments of the inventive concepts disclosed herein are directed to a horizontal digestion system that uses multiple, length-wise sub vessel heat blankets and/or internal heat blankets or pipes, combined with fluidic thermal injection and agitation by zone to ensure consistent temperature control across many sizes and shapes of horizontal vessel formats.

In a further aspect, embodiments of the inventive concepts disclosed herein are directed to a FIFO digestion system that uses multiple vertical digesters in an orderly sequence that ensures with retention time and temperature, using intelligently controlled, fluidic agitation, with or without mechanical assist, that ensures orderly destruction, temperature management and inoculation at one or more points, using zonal jet controls, supported by inoculant and heated material injection at one or more digesters and areas within vertical tanks of varying sizes and shapes.

In a further aspect, embodiments of the inventive concepts disclosed herein are directed to a FIFO digestion system that allows fluidic injection to add new organic substrates at multiple time and locations within the vessel in order to maximize methanization rate and biomethane ratios within biogas.

In a further aspect, embodiments of the inventive concepts disclosed herein are directed to a FIFO digestion system that allows fluidic injection to migrate materials backwards from one zone to another without allowing raw feedstock and/or pathogens to migrate forwards.

In a further aspect, embodiments of the inventive concepts disclosed herein are directed to a FIFO digestion system wherein FIFO digestion vessels employ combinations of sub-vessel, internal and fluidic injection heating, with or without mechanical agitation, with or without material injection, with or without baffles, to ensure precise temperature and material migration along horizontal vessels of various sizes and shapes.

In a further aspect, embodiments of the inventive concepts disclosed herein are directed to a FIFO digestion system wherein fluidic injection and agitation optimize anaerobic activity using through chamber mixing with control over fluidic pressure (stimulus), flow rates, frequency, material volume, inoculation, new solid injection and material direction by zone.

In a further aspect, embodiments of the inventive concepts disclosed herein are directed to a ZW treatment system wherein fluidic injection is employed in order to boost biomethane production by metering in pretreated lipids-proteins-other methane rich materials, injected at one or more fluidic injection zones within a digester, yet comply with material, time and retention requirements of organic and food safety restrictions.

In a further aspect, embodiments of the inventive concepts disclosed herein are directed to a ZW treatment system that filters wastewater and treats organic waste to [a] produce high quality, organically certified biofertilizers of multiple formulas, grades and methods of delivery, [b] maximize bioenergy production of high-density biofuels, [c] select chemical byproducts and [d] select biomaterials byproducts.

In a further aspect, embodiments of the inventive concepts disclosed herein are directed to a FIFO digestion system of claim x wherein fluidic injection is employed in order to boost biohydrogen, biomethane and/or carbon dioxide production by metering in preteated carbohydrate-lipids-proteins-other materials, injected at one or more fluidic injection zones within a digester, yet comply with material, time and retention requirements of organic and food safety restrictions.

In a further aspect, embodiments of the inventive concepts disclosed herein are directed to a FIFO digestion system of claim x wherein thermal-fluidic injection and one or more heat pipes and/or one or more length wise heat blankets ensure persistent control across the length of a diversity of horizontal tank formats, including shape, size and length.

In a further aspect, embodiments of the inventive concepts disclosed herein are directed to a ZW treatment system of claim 1 that filters wastewater and treats organic waste to [a] produce high quality, organically certified biofertilizers of multiple formulas, grades and methods of delivery, [b] maximize bioenergy production of high-density biofuels, [c] select chemical byproducts and [d] select biomaterials byproducts.

In a further aspect, embodiments of the inventive concepts disclosed herein are directed to a ZW treatment system that boosts biohydrogen and biomethane density ratios via extended hydrolysis and/or fluidic injection of specific ingredients, combined with advanced biogas treatment from one or more stages within the process that supports separation into constituent gases and chemicals.

In a further aspect, embodiments of the inventive concepts disclosed herein are directed to a ZW treatment system that filters wastewater and treats organic waste to [a] produce high quality, organically certified biofertilizers of multiple formulas, grades and methods of delivery, [b] maximize bioenergy production of high-density biofuels, [c] select chemical byproducts and [d] select biomaterials byproducts.

In a further aspect, embodiments of the inventive concepts disclosed herein are directed to a biogas production and treatment system wherein multiple stages of blend-heat-inoculate, hydrolysis-acidification, acetogenesis and methanization can be boosted with fluidic injection of precise inoculants and secondary ingredients, at one or more points, extending retention times per recipe, such that ratios of biohydrogen, biomethane and/or carbon dioxide are enhanced for separation of end-use content.

In a further aspect, embodiments of the inventive concepts disclosed herein are directed to a biogas production and treatment system wherein biogas is converted to multiple constituents of biohydrogen, biomethane, hydrogen-sulfide, carbonic acid or carbonated liquids and residual water, gaseous products being injected and/or compressed to various export standards.

In a further aspect, embodiments of the inventive concepts disclosed herein are directed to a biogas production and treatment system wherein.

In a further aspect, embodiments of the inventive concepts disclosed herein are directed to a biogas production and treatment system wherein biomethane achieves purity levels above that enables compression and transport to injection points, conversion operators or end-use locations.

In a further aspect, embodiments of the inventive concepts disclosed herein are directed to a biogas production and treatment system wherein carbon dioxide liquids can be used as ingredients for organic formulas.

In a further aspect, embodiments of the inventive concepts disclosed herein are directed to a ZW treatment system that supports converting multiple raw feedstocks to organic standards for use in boosting ingredient content and/or producing organically compliant teas and inoculants that enhance biofertilizers and organic pest control mediums.

In a further aspect, embodiments of the inventive concepts disclosed herein are directed to a feedstock conversion system that supports purpose grown feedstock, in-vessel composting, worm castings, biochar, grinding, milling, photobioreactors and/or other biomaterial conversion methods that enable precise integration of specific characteristics and ingredients for use with aerobic and/or anaerobic batches of organic blends.

In a further aspect, embodiments of the inventive concepts disclosed herein are directed to a feedstock conversion system that facilitates reception, allocation and transference of material via multiple methods including pumping via pipes, conveyor, elevator, mobile bins, robotic bin systems, front-end loader, compressed air ingredient kits and/or other methods which facilitate precise ingredient supply.

In a further aspect, embodiments of the inventive concepts disclosed herein are directed to a feedstock conversion system that employs aerobic extractors and/or brewers to produce organic teas and aerobic inoculants for combining with anaerobic digestate in aerating-blend tanks.

In a further aspect, embodiments of the inventive concepts disclosed herein are directed to a feedstock conversion system that uses multiple methods to safely store seasonal feedstocks and treated ingredients for later use. Bagging, bottling, containers, cooling, aerating, etc.

In a further aspect, embodiments of the inventive concepts disclosed herein are directed to a ZW treatment system wherein multiple organic mediums from aerobic and/or anaerobic sources can add, blend, brew, screen, filter, inoculate, aerate, cool and/or heat per recipe requirements.

In a further aspect, embodiments of the inventive concepts disclosed herein are directed to an organic blend system that separates, filters, aerates, boosts and further treats digestate and organically compliant feedstocks to produce a variety of formulas, grades, characteristics and application methods that enable persistent and just-in-time biofertilizer optimization for organic crop feeding, organic pest control, aquaponic and/or photobioreactor applications.

In a further aspect, embodiments of the inventive concepts disclosed herein are directed to an organic blend system that produces ultrafine particles yet concentrated mediums for drip irrigation, foliar feeding mists and foliar pest control.

In a further aspect, embodiments of the inventive concepts disclosed herein are directed to an organic blend system that supports converting multiple raw feedstocks to organic standards for use in boosting ingredient content and/or producing organically compliant teas and inoculants that enhance biofertilizers and organic pest control mediums.

In a further aspect, embodiments of the inventive concepts disclosed herein are directed to an organic blend system that screens and filters mediums to remove macro solids for use in mulch, pelletizers, crop dressings, jet sprayer, soil injection and other crop feeding methods.

In a further aspect, embodiments of the inventive concepts disclosed herein are directed to an organic blend system that produces organic teas, liquefied biofertilizers and organic pest control by combining filtered anaerobic concentrates with aerobic mediums or inoculants, nutrient adders, milled biosolids, pest-control ingredient and/or other characteristics that enable unique blends for micro irrigation, foliar feeding, aquaponics, root-injection, root-sprayers, pest control sprays or mists and/or other application methods.

In a further aspect, embodiments of the inventive concepts disclosed herein are directed to a ZW treatment system wherein base recipes can be adjusted and boosted per formulaic requirements, including microbial activation, micro solids adders, nutrient concentration, pelletization, nitrogen-fixing materials and/or cultures, enzymes and other desirable characteristics per application and customer requirements.

In a further aspect, embodiments of the inventive concepts disclosed herein are directed to a formulaic adjustment system wherein various grades and formulas can be further adjusted by adding various boosters to satisfy precise nutrient requirements of various crops, soil and/or aqua feeding combinations that evolve with weather, irrigation and growth cycles at each location.

In a further aspect, embodiments of the inventive concepts disclosed herein are directed to a formulaic adjustment system wherein various grades and formulas can be biologically activated via warm aeration, heated brewing systems, chemical aeration, inoculant blending, enzymes and/or other microbial stimulation methods.

In a further aspect, embodiments of the inventive concepts disclosed herein are directed to a formulaic adjustment system wherein final formulas can be concentrated; using pelletizers, drying, bottling and/or other methods; for storage, long-range shipping and/or retail delivery, with or without activator mediums that would be applied prior to use.

In a further aspect, embodiments of the inventive concepts disclosed herein are directed to a ZW treatment system wherein customer mediums can be further treated in-transit, at distributors and/or on-site, adjusting and/or blending formulaic characteristics to enhance and/or replenish content with or without information from customer monitoring systems, including tank-level, crop sensors, smart irrigation, aquaponic and/or other nutrient management systems.

In a further aspect, embodiments of the inventive concepts disclosed herein are directed to a smart organic delivery system that employs multiple interconnected fluid tanks with various blends, adders and inoculants able to change blends, in-transit or at the customer site, adjusting formulaic delivery per customer-request or in response to crop control systems.

In a further aspect, embodiments of the inventive concepts disclosed herein are directed to a smart organic delivery system that employs multiple interconnected biosolids tanks with various biosolid blends, adders able to integrate biosolids blends, in-transit or at the customer site, adjusting formulaic delivery per customer-request or in response to crop control systems.

In a further aspect, embodiments of the inventive concepts disclosed herein are directed to a smart organic delivery system that uses geospatial data, robotics, fixed and/or drone video-analyzed data, and/or satellite provided data, monitoring crop feeding plans, local environmental conditions, tank levels, weather conditions, smart irrigation schedules and/or crop-monitoring data for use in anticipating and responding to replenishment requirements.

BRIEF DESCRIPTION OF THE DRAWINGS

For a fuller understanding of the inventive embodiments, reference is made to the following descriptions taken in connection with the accompanying drawing in which.

DETAILED DESCRIPTION

In the following description, several specific details are presented to provide a thorough understanding of embodiments of the inventive concepts disclosed herein. One skilled in the relevant art will recognize, however, that embodiments of the inventive concepts disclosed herein can be practiced without one or more of the specific details, or in combination with other components, etc. In other instances, well-known implementations or operations are not shown or described in detail to avoid obscuring aspects of various embodiments of the inventive concepts disclosed herein.

Figure 1:
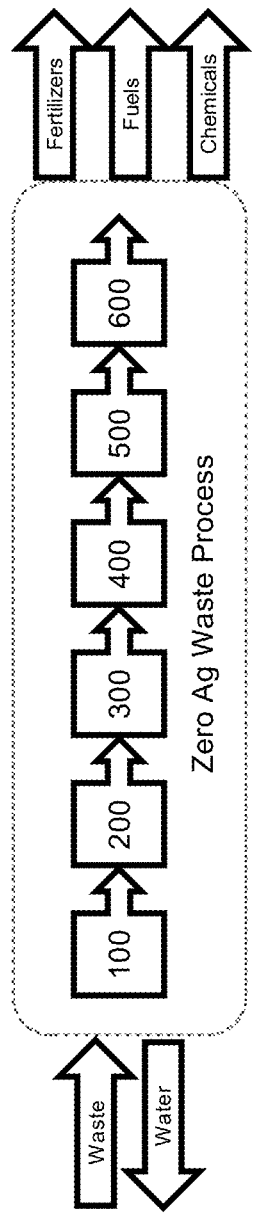
FIG. 1 illustrates a first block diagram of an exemplary ZW treatment process.
Figure 2:
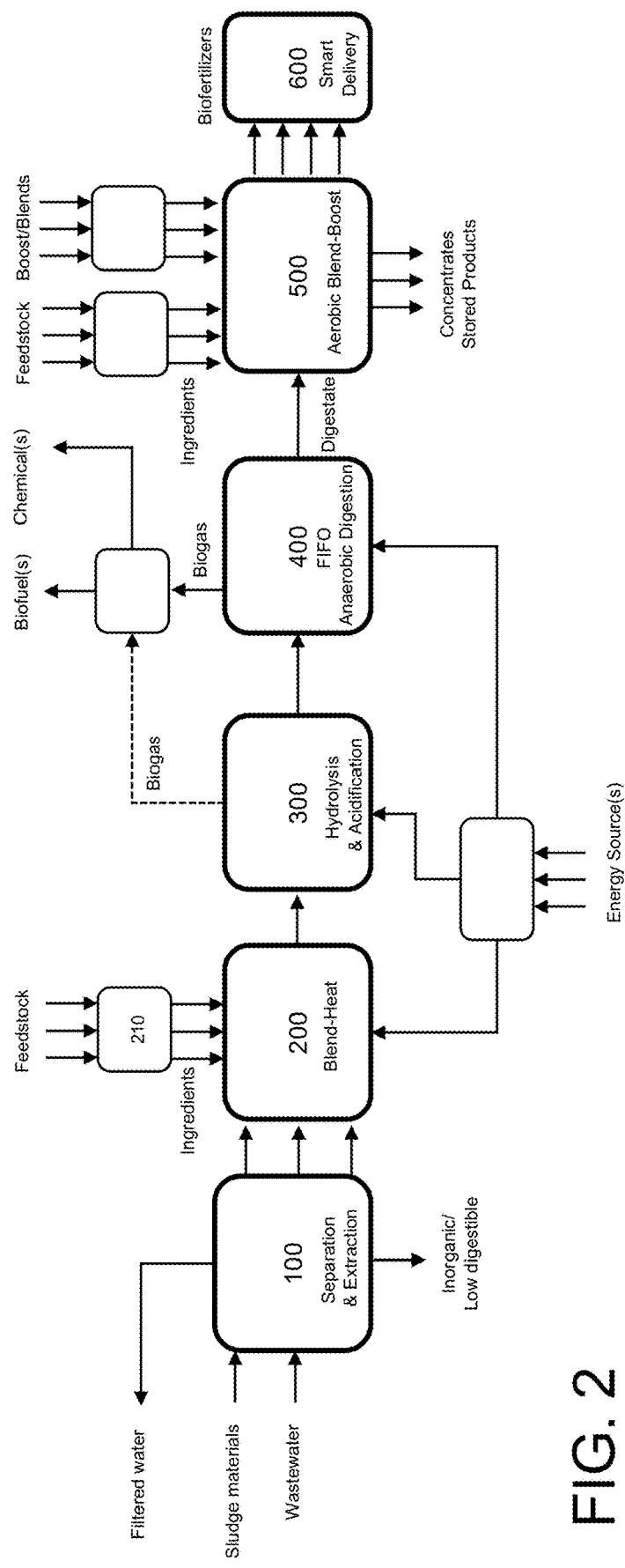
FIG. 2 illustrates a second block diagram of an exemplary ZW treatment process, in accordance with some embodiments.

Referring now to FIGS. 1 and 2, block diagrams of an exemplary ZW treatment process 1 suitable for implementation of the inventive concepts described herein is illustrated. ZW treatment process 1 may be configured to accept multiple sources of material input to deliver multiple material outputs. In some embodiments, sources of material input could include, but not be limited to, raw wastewater, sludge, bulky materials, raw feedstock, certified organic feedstock, and certified organic boosters. In some embodiments, the material outputs could include, but not be limited to, sand, fiber, filtered water, renewal natural gas, bio-hydrogen, solid soil amenders, liquefied bio-fertilizers, liquefied organic pest control organic concentrates, hydrogen-sulfide chemicals, and carbon dioxide liquids.

ZW treatment process 1 could include the following individual processes: a separation and extraction process 100, a blend-heat process 200, a hydrolysis and acidification process 300, a first-in, first-out (FIFO) anaerobic digestion process 400, an aerobic boost-blend process 500, and a smart delivery process 600. As will be discussed below, some of the processes including blend-heat process 200, hydrolysis and acidification process 300, and FIFO anaerobic digestion process 400 will include heating which could be provided by multiple energy sources including, but not limited to, electric power, renewable fuels, propane, solar energy, and wind energy.

Figure 3:
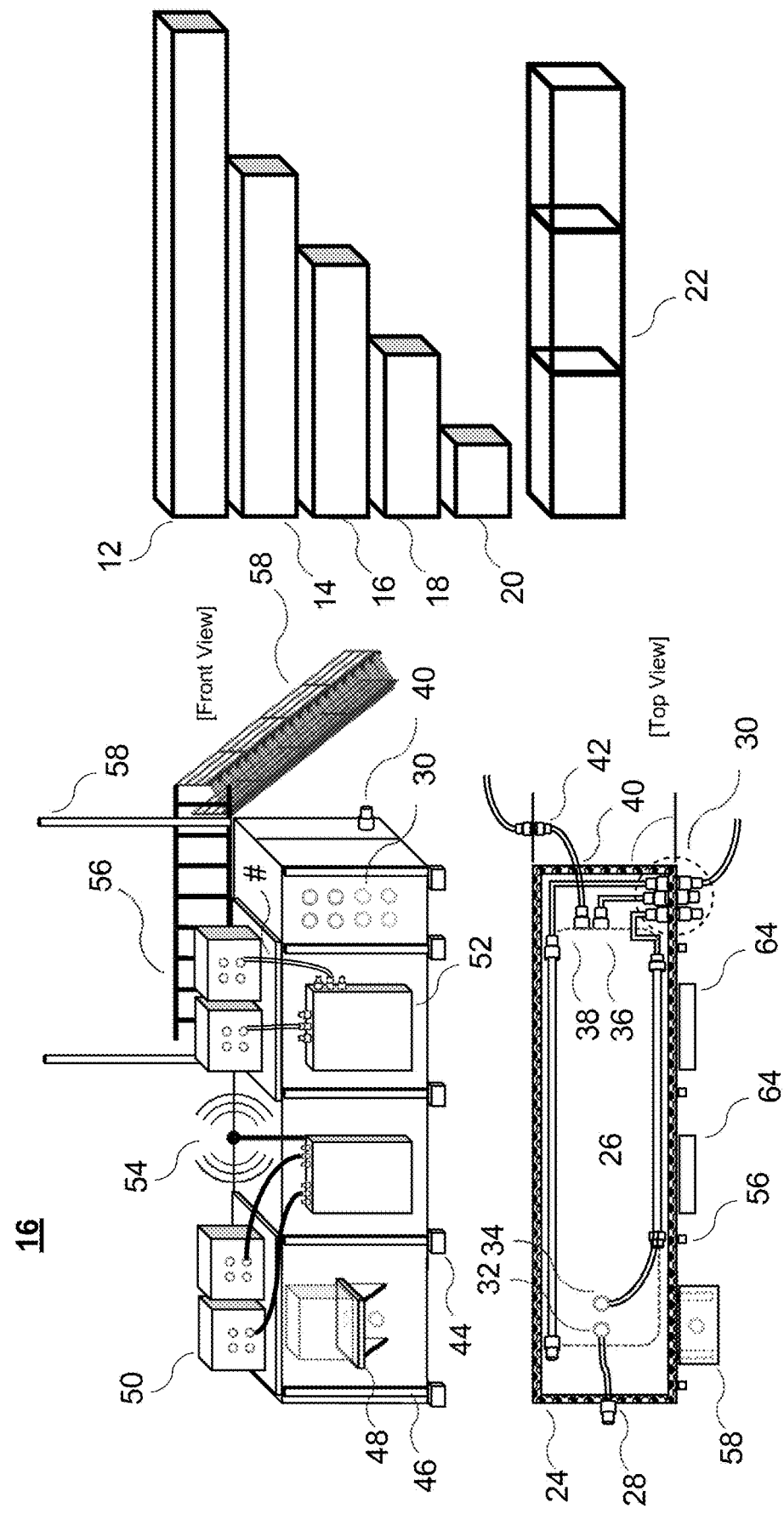
FIG. 3 illustrates an exemplary module container system, in accordance with some embodiments.

Referring now to FIG. 3, exemplary illustrations of a module container system 10 suitable for implementation of the ZW treatment process 1 is illustrated. Module container system 10 may include module containers 12, 14, 16, 18, and 20 having different sizes, where the actual size that is needed may depend on, for the purpose of illustration and not of limitation, the number of tanks and/or vessels required to perform one or more of the individual processes of the ZW treat process 1. Where multiple modular containers are employed, they may be arranged so that one is adjacent to another such as, for instance, the serial arrangement 22 of three module containers 18 as shown. For the purpose of discussion herein, modular container 16 will be referred to herein an exemplar for any size module container.

In some embodiments, each modular container could include various types of equipment mounted on structurallyreinforced, pre-plumbed and prewired containers, or custom-designed jig-skid assemblies that may be stacked and connected for self-sufficient applications with limited space for waste treatment systems. As shown, each modular container 16 could include an enclosure 24 configured to house one or more containers such as tanks and vessels. For the purpose of illustration, a container 26 is shown inside enclosure 24, where container 26 could be a stratification-syphoning tank 112 discussed below. It should be noted that, although not illustrated, enclosure 24 includes the components and attaching hardware needed to secure container(s) 26 within enclosure 24.

Each enclosure 24 could include multiple fittings and/or couplings 28 and 30. In some embodiments, fittings and/or couplings 28 and 30 may facilitate, as shown with internal plumbing lines and/or conduits configured within enclosure 24, a user's ability to couple to various ports 32, 34, and 36 of container 26 from outside of enclosure 24 (and modular container 26). In some embodiments, enclosure 24 could include an opening(s) 40 for facilitating a user's ability to directly couple to a port(s) 38 from outside of enclosure 24 (and modular container 26) without a need for internal plumbing lines and/or conduits configured within enclosure 24.

Modular container 16 could also include one or more footings 44; one or more structural reinforcements 46; one or more mounts 48 for various types of equipment 50; one or more enclosures for controls and equipment 52; one or more network connections 54; one or more catwalks with rails 56; one or more manway access areas (not shown); stairs and/or ladders 58; and/or one or more modular supports 58 for overhead structures for providing shade and/or supporting solar energy assets for solar thermal, photovoltaic or hybrid thermal-photovoltaic options. In some embodiments, modular container 16 could include electrical components and/or hardware for providing power to some or all of the electrically-powered equipment supporting the ZW treatment process 1 such as, but not limited to, sources of heat, various valves, and a control system. In some embodiments, modular container 16 may be fitted with insulation and/or HVAC for severe climate conditions.

Figure 4:
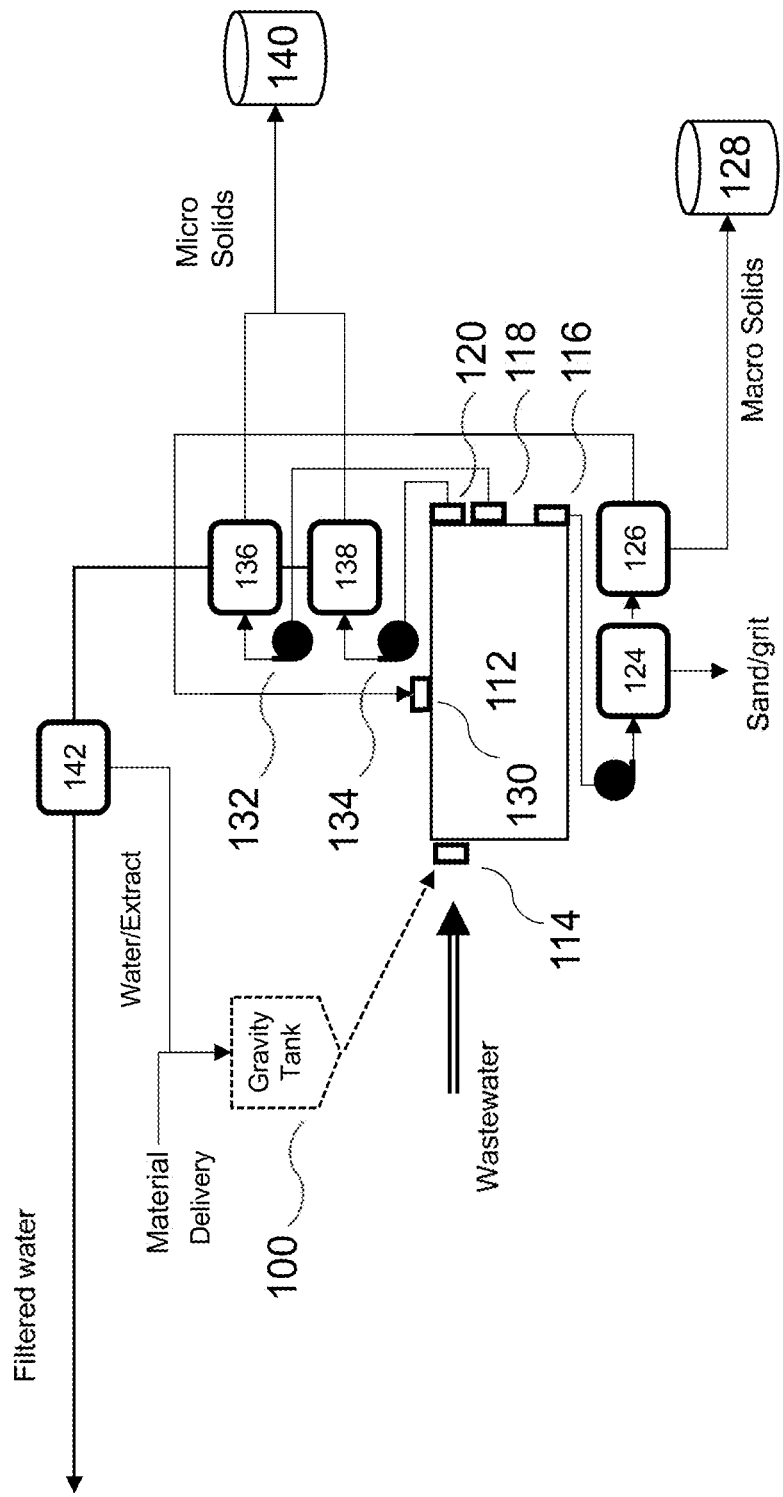
FIG. 4 illustrates an exemplary separation and extraction system, in accordance with some embodiments.

Referring now to FIG. 4, an exemplary diagram of a separation and extraction system 110 suitable for implementation of separation and extraction process 100 is illustrated. In some embodiments, separation and extraction system 110 may be configured to accept input materials such as wastewater and/or sludge (including and hydrated dry materials) and deliver filtered water and organic materials.

The separation and extraction system 110 may include a stratification-syphoning tank 112 with a feed port 114 configured to receive the input materials; although one feed port 114 is presented, there may be more than one to facilitate feeds from separate sources. The input materials may originate from multiple sources and could include, but not be limited to, wastewater (e.g., fluids effected by human use), sludge, bulky materials, certified organic feedstock, certified organic boosters, manure and separated barn flush, varying degrees of manure sludge, leftover fluids associated with ethanol production, produce packaging, food and beverage production, mining, oil extraction, and fracking, and dry matter and/or sludge that has been hydrated to facilitate a removal of sand and other fibrous solids during separation and extraction process 100. In some embodiments, feed port 114 may be configured to support continuous, discontinuous, and/or volatile flows of wastewater and sludge of variable compositions.

Stratification-syphoning tank 112 includes lower, middle and upper ports 116, 118, and 120, respectively, through which inorganic and organic materials may be segmented and extracted from the materials found in stratification-syphoning tank 112. Lower port 116 may be a siphoning port through which a stream of settling, sediment, and/or settleable solids, i.e., solids that have settled at the bottom of stratification-syphoning tank 112 may be siphoned and pumped by constant- or variable-flow pump 122 to a series of devices such as separators 124 and 126 which could be screen-, centrifugal-, centripetal-, and/or filter-based systems, where the pump and separators may be controlled through a control system discussed below. In some embodiments, separator 124 may be configured to separate the settleable solids into inorganic solids such as, but not limited to, sand, grit, and/or fiber from the organic solids found in the stream. Then, the stream may be subjected to separator 126 configured to extract macro organic solids that may be provided to a holding tank 128 for subsequent processing. In some embodiments, separator 126 could be configured to support organic materials of variable sizes such as, for the purpose of illustration and not of limitation, 100 to 300 microns. The remaining stream may be returned to stratification-syphoning tank 112 through a return port 130. In some embodiments, the remaining steam may impart turbulence near feed port 114 which could improve the separation of small solids entering though feed port 114.

Middle and upper ports 118 and 120 may siphoning ports through which a stream of organic solids which may be comprised of suspended and/or buoyant solids as discussed below. These suspending or buoyant solids may be siphoned by controllable constant- or variable-flow pumps 132 and 134, respectively, subjected to parallel controllable filters 136 and 138, respectively. As shown, filters 136 and 138 may extract micro organic solids from fluid that may be provided to holding tank 140 for subsequent processing. Each filter 136 and 138 could be configured to support variable sizes such as, for the purpose of illustration and not of limitation, 5 to 100 microns. In some embodiments, each filter 136 and 138 may support different sizes; if so, then filtered organic material from each filter could be routed to individual tanks (not shown). After being subjected to filters 136 and 138, the remaining stream may then subjected to controllable filter 142, where a portion of the fluid may be routed to input port 114.

In some embodiments, an overflow port (not shown) may be included near the top of stratification-syphoning tank 112 to accommodate those times when the flow into feed port may be excessive and causing stratification-syphoning tank 112 to fill to its limit; in such instance, a line may be connected to the overflow part and connected to another stratification-syphoning tank 112 which could serve as an overflow tank. If needed, more tanks could be used to form a daisy chain of lines connecting overflow ports to feed ports.

As discussed above, fluidic separation system 110 provides macro and micro organic solids to holding tanks 128 and 140, respectively, each of which could have the same or different sizes but share the same configuration for agitating, chopping, and/or sonically destructing the organic solids to reduce particle size and destroy cell wall of less digestible materials such as, but not limited to, lignin. Each holding tank 128 and 140 includes a feed port configured to receive organic solids. Controllable recirculation and/or chopper pump(s) may be employed to agitate and/or chop the organic solids while controlling the direction and rate of flow of the recirculation. In some embodiments, controllable fluidic jet(s) that may be employed to further agitate the organic solids. In some embodiments, sonic destructors may be employed to further reduce particle sizes of the organic solids. A controlled, switchable valve may be configured to control the delivery of the organic solids for subsequent processing.

It should be noted that the ZW treatment process 1 employs a control system with one or more processing devices communicatively coupled with, either on-site or remotely, the various components to control some or all of the operations of the various components discussed herein such as, but not limited to, separating/filtering/extracting devices, pumps, jets, agitators, and/or material destructing devices. Although not shown herein, sensors representative of a variety of measurements are employed throughout the ZW treatment process 1 for providing sensory input to the processing device(s) so that, in accordance programmable instructions/algorithms, the receiving, routing, production, and/or delivery of some or all of the various materials used in the ZW treatment process 1 are monitored and controlled through the programmed manipulation of the various components.

Figure 5:
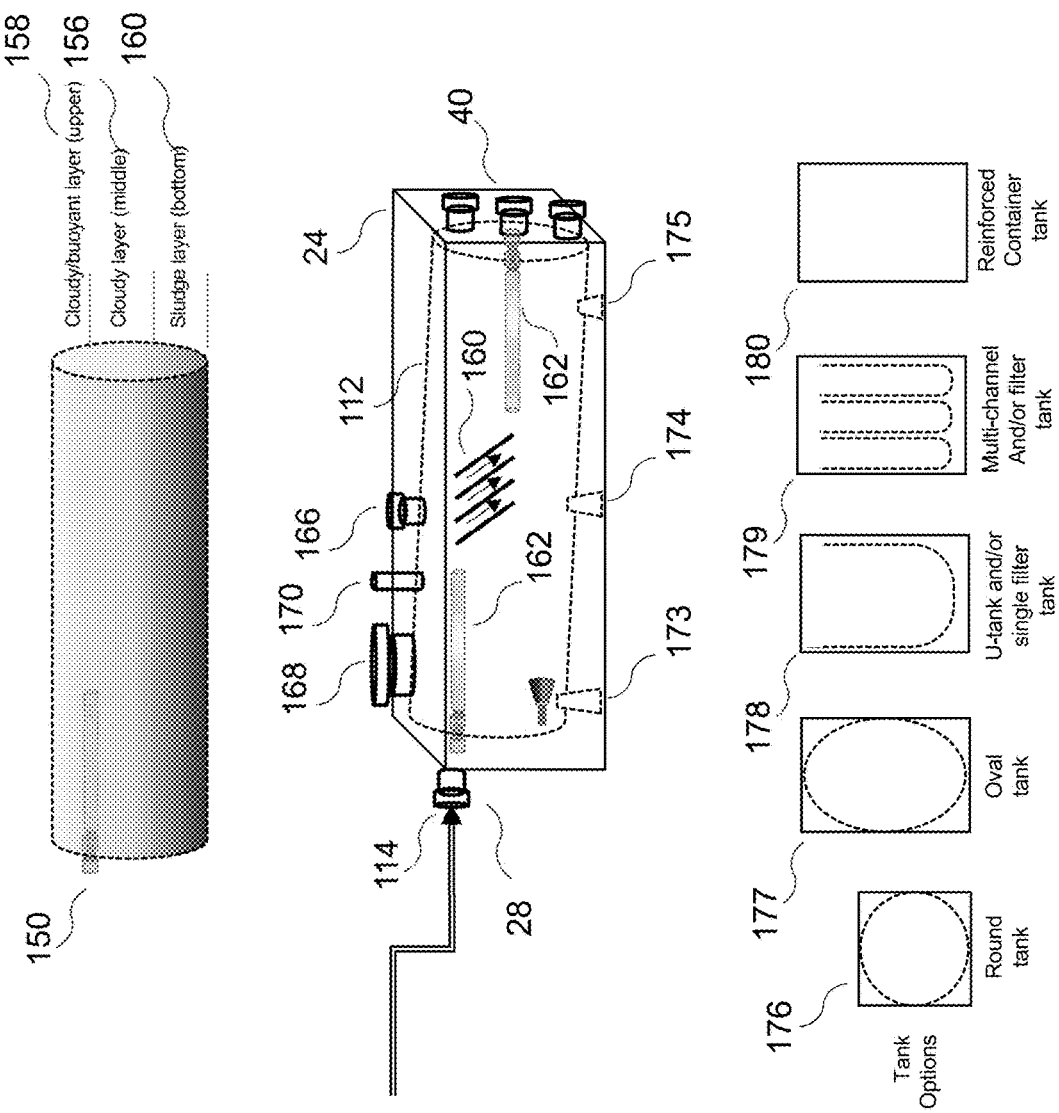
FIG. 5 illustrates an exemplary stratification-syphoning tank, in accordance with some embodiments.

Referring now to FIG. 5, an exemplary stratification-syphoning tank 112 is illustrated in which materials may be stratified into multiple layers after being received through the feed port 114 and/or return port 130, respectively. Through a natural stratification process, a sludge (bottom) layer 154 may include dense sludge and solids that have settled at the bottom and may be siphoned via lower port 116, a cloudy (middle) layer 156 could include suspended solids that may be siphoned via middle port 118, and a cloudy/buoyant (upper) layer 158 could include buoyant solids that may be siphoned via upper port 120. To facilitate a downward movement of materials entering through feed port 114, stratification-syphoning tank 112 could be configured with a clarifier and/or flanges 160. In some embodiments, siphon(s) 162 could be extended within stratification-syphoning tank 112 to prevent of large solids from entering cloudy layer 156 and/or to extend siphoning from sludge layer 154 along relatively lengthy horizontal dimension of stratification-syphoning tank 112 (as opposed to tipping the tank to facilitate solids migration).

In some embodiments, stratification-syphoning tank 112 could be placed in enclosure 24 configured with fitting and/or coupling 28 for facilitating coupling to feed port 114; openings 40 for facilitating coupling to bottom, middle, and upper ports 116, 118, and 120; respectively; and opening 166 for facilitating coupling to return port 130. In some embodiments, enclosure 24 could include additional openings such as a manway(s) 168 and/or vent(s) 170. In an arrangement in which stratification-syphoning tank 112 is gradually elevated, enclosure 24 could include saddles 173, 174, and 175 having variable heights. Although not illustrated, stratification-syphoning tank 112 could be comprised of footings having variable heights to achieve the same arrangement.

Stratification-syphoning tank 112 could be configured with one of a plurality of tank formats including, but not limited to, round 176, oval 177, u-shape 178, multi-channel 179, and water-tight enclosure 180. In some embodiments, filter tanks include filter blinding and narrow turbulence conditions.

Figure 6:
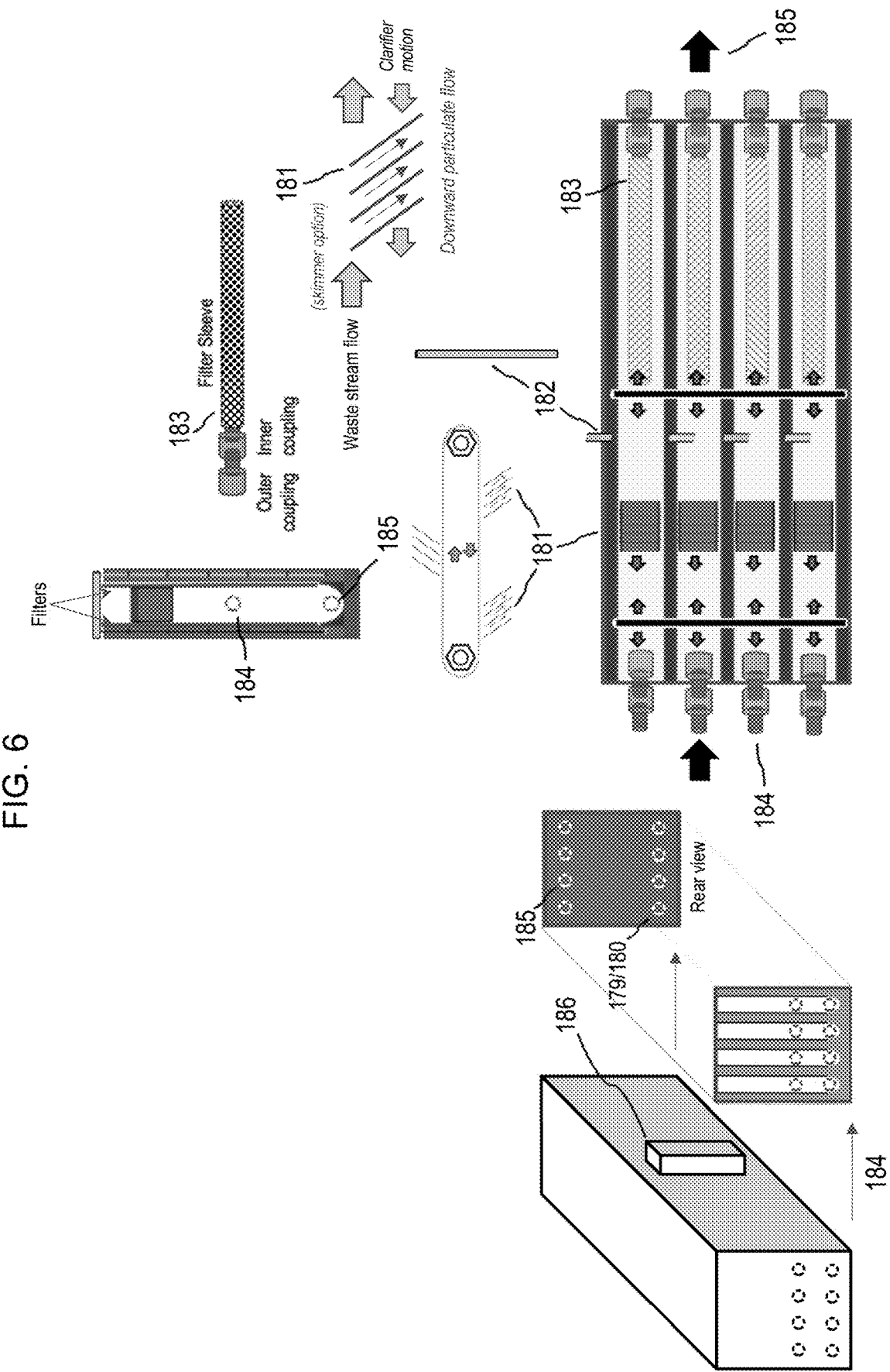
FIG. 6 illustrates exemplary standard operations and maintenance procedures, in accordance with some embodiments.
Figure 7:
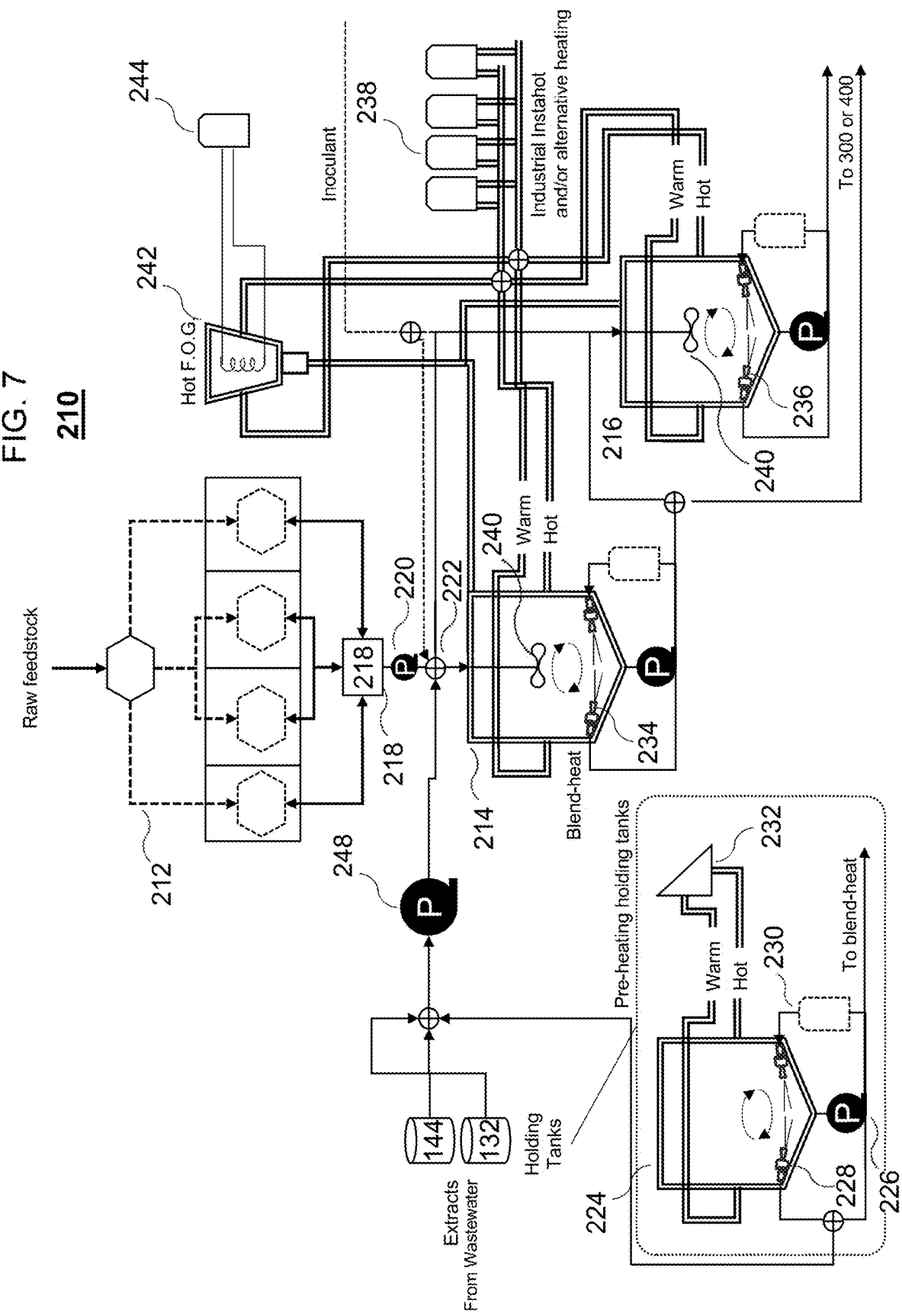
FIG. 7 illustrates an exemplary a blend-heat system, in accordance with some embodiments.

Referring now to FIG. 6, these factors may become manageable with standard operations and maintenance procedures such as an addition of sprayer systems 180 having fixed flanges or moving clarifier blades 181 and tank/channel level monitors 182, and/or syphon filters 183. Filter tanks may support multiple feed port options 184 including various mesh sizes, multiple mesh layers, multiple mesh types per panel for directional optimization and various type of mesh material. Filter tanks may also support multiple capacities using a variety of container sizes. These enhancements include adding feed 184 and syphoning ports 185, sprayers where necessary, and control system enclosures 186 for tank sensors and filtration control. These same tanks could be used in a fixed application on site at the ZW treatment facility or as a satellite concentration system in a hub-n-spoke network configuration, wherein organic concentrates are delivered to a nearby ZW treatment site through delivery means such as, for example by pipe or truck.

Figure 8:
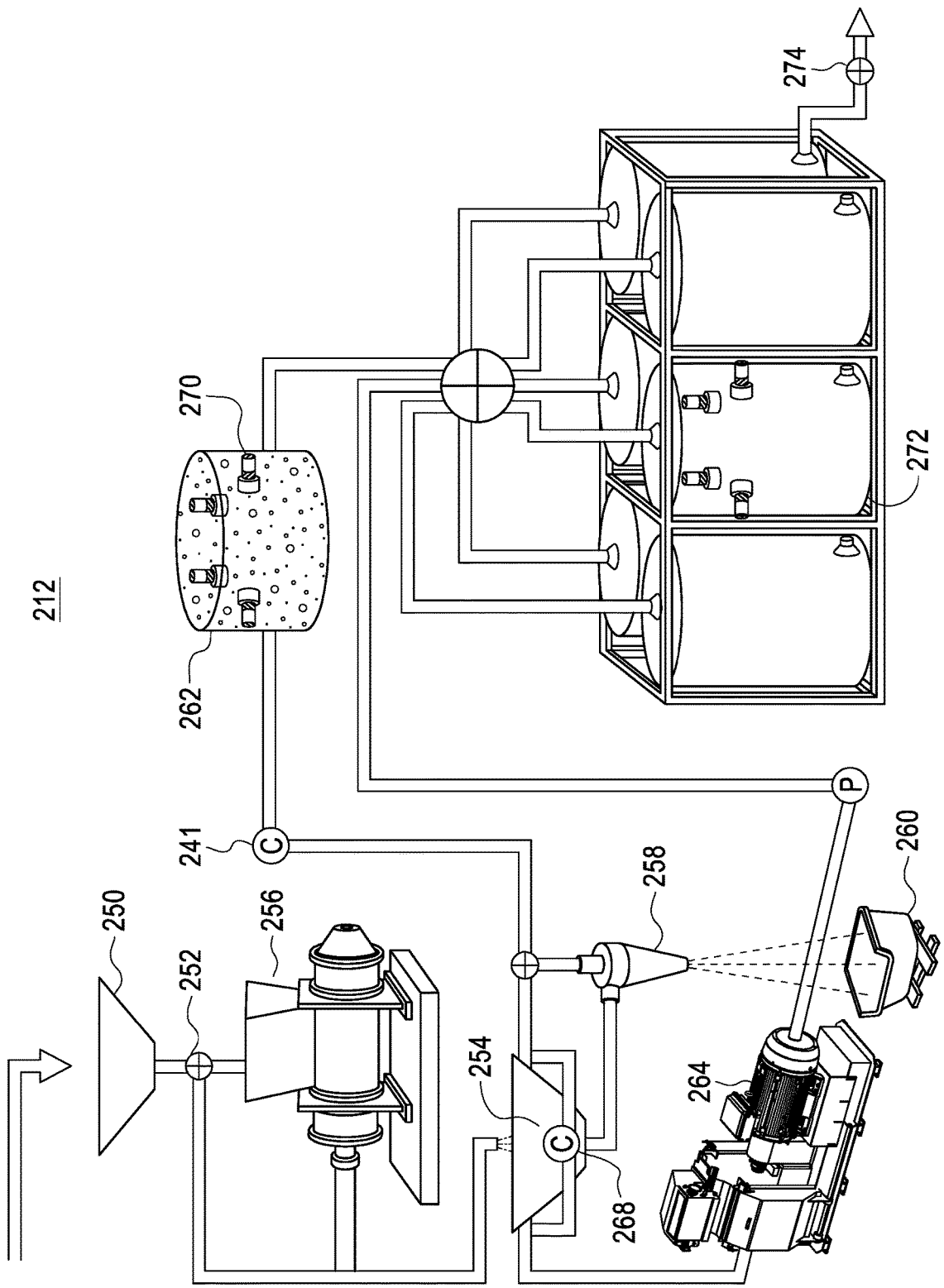
FIG. 8 illustrates an exemplary controllable feedstock pretreatment system, in accordance with some embodiments.

Proceeding now to FIG. 8, an exemplary diagram of a blend-heat system 210 suitable for implementation of blend-heat process 200 is illustrated. In some embodiments, blend-heat system 210 may be configured to accept raw feedstock materials that may be subjected to a controllable feedstock pretreatment system 212 for the production of ingredients that may be subjected to one or more controllable blend-heat tanks 214 and 216 for accelerating heating and mixing via fluidic agitation and/or mechanical agitation to prepare each batch recipe for subsequent processing.

Controllable metering device 218 may be employed to supply quantity metered supply of ingredients as determined from recipe requirements stored by the control system. A controllable pump 220 may provide the metered ingredients to blend-heat tanks 214 and 216 through controllable, switchable valve 222. Switchable valve 222 could also be configured to receive metered organic materials (controllable metering device not shown) contained in holding tanks 128 and 140 such as those produced by separation and extraction process 100, where these materials could be pumped from holding tanks 128 and 140 (controllable pumps not shown).

In some embodiments, the organic materials contained in holding tanks 128 and 140 may be pumped to a pre-heating holding tank 224 (controllable pump not shown) prior to being routed to blend-heat tanks 214 or 216 via switchable valve 222 because, for instance, a recipe may require the use of pre-heated organic material. In some embodiments, the materials may be recirculated by a controllable pump 226 and fluidic jets 228, where the fluidic jets 228 could be a source of agitation. In some embodiments, the materials injected by fluidic jets 228 may be heated as indicated by a heat source 230. In some embodiments, blend-heat tanks 214 and 216 and pre-heating holding tank 224 could be configured with controllable sonic destructors for reducing sizes of particle in the material. It should be noted that, although heat source 230 is shown as part of the recirculation loop here and elsewhere herein, heat source 230 is presented to indicate that, in some embodiments, the material injected into pre-heating holding tank 224 may be heated by one heat source located elsewhere. In some embodiments, the materials in pre-heating holding tank 224 may be heated (by the same or another hear source) through physical contact with plumbing through which hot fluid heated is pumped (controllable pump not shown). As shown, the fluid has been heated by controllable solar source 232 in this embodiment.

In some embodiments, a recipe may require the use of an inoculant, where such inoculant could be produced and/or provided by anaerobic digestion process 400; in such case, the inoculant could be pumped to switching valve 222 (controllable pump not shown) for addition into the blend-heat tanks 214 and 216. In some embodiments, the inoculant could also be injected into blend-heat tanks 214 and 216 via fluidic jets 234 and 236, respectively, (not shown) where the inoculant could be heated prior to being injected. Similar to the pre-heating holding tank 224, the materials in blend-heat tanks 214 and 216 could be recirculated by controllable pumps are shown. Also, similar to the pre-heating holding tank 224, the materials in blend-heat tanks 214 and 216 may be heated (by the same or another heat source) through physical contact with plumbing through which hot fluid is pumped (controllable pump not shown). As shown, the fluid has been heated by industrial instahot heating system in this embodiment. In some embodiments, materials in holding tanks may be agitated through mechanical agitators 238 and 240.

The organic materials and/or inoculants do not need to be added to the blend-heat tanks 214 and 216 through switchable valve 222. In some embodiments, materials may be added directly to blend-heat tanks 214 and 216 (not shown). For example, materials including raw materials 242 represented as F.O.G. (fats, oils, and greases) may be preheated with a heating element (represented by a coil) powered by a heat source 242. Additionally or alternatively, a centrifuge may be applied to raw materials 242 to separate materials as necessary.

Referring to FIG. 8, an exemplary implementation of controllable feedstock pretreatment system 212 is illustrated which includes a feed hopper 250 that may accept material from multiple methods of conveyance. In some embodiments, the material may be gravity fed and routed, via a controllable switchable valve 252, to a hopper-tank 254 directly or a controllable grinder-mincing asset 256, where direct routing could depend upon the composition of the material and recipe requirements. Controllable hopper-tank 254 may be configured to hydrate, chop, and/or remove unwanted materials, such as but not limited to sand and grit, with a controllable hydrocyclone or other equivalent asset 258 prior to being delivered to a tipper tank 260 or the ground or bin. Depending upon the recipe, materials could be routed, via a switchable valve, to holding tank 262 directly or indirectly through a mill 264 for milling destruction or a holding tank 262 through a chopper pump 268 for destruction by sonic destructors 270. Each batch of material may be held in a respective holding tank 262 as ingredients for the recipe. In some embodiments, holding tank 272 may be a configured as a pretreatment tank in which the ingredients such as, but not limited to, ligneous materials therein may be subjected to one or more methods including soaking, microwaves, sonic waves, flash temperatures, acids, and/or ultraviolet light to improve the quality as anaerobic ingredients. When required by the recipe, the ingredients in the holding tanks may be routed to metering device 218 through controllable switchable valve 274.

Figure 9:
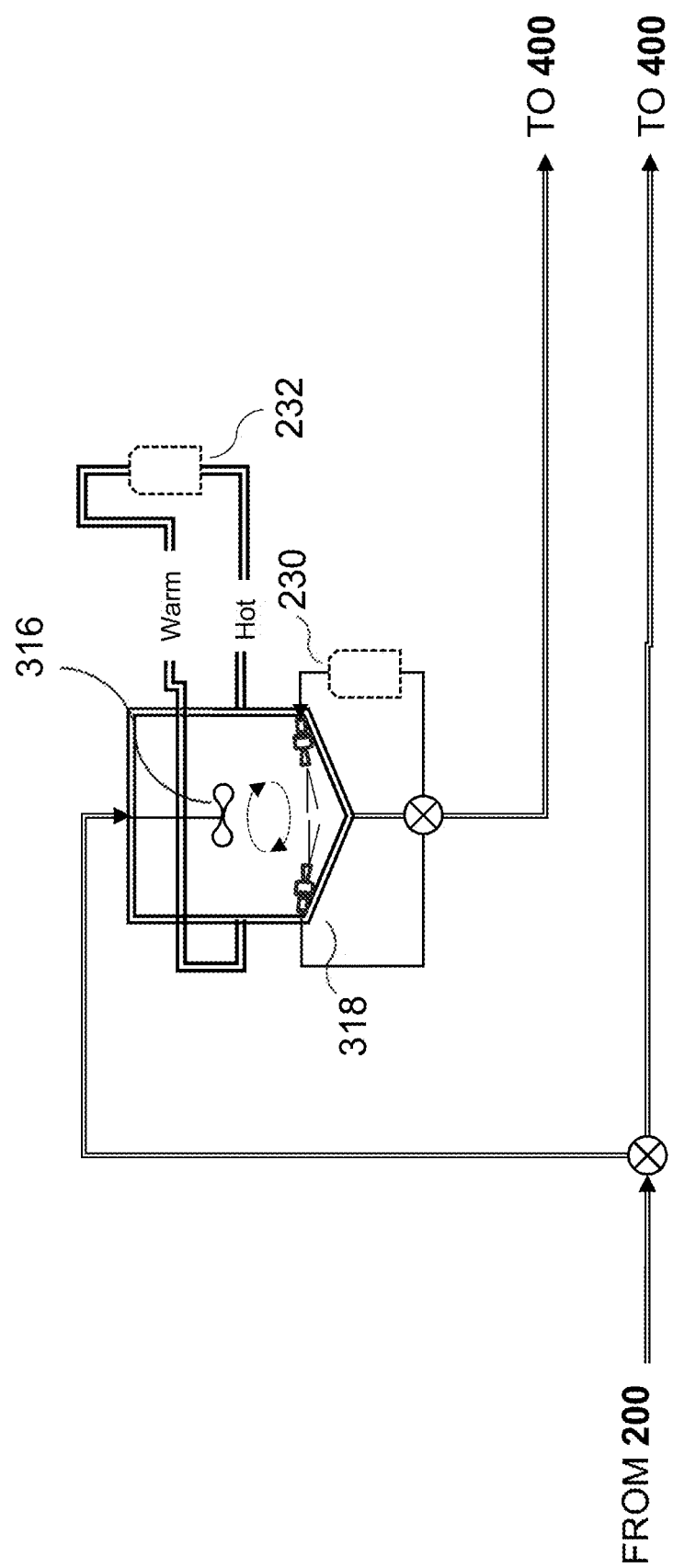
FIG. 9 illustrates an exemplary hydrolysis and acidification system, in accordance with some embodiments.

Proceeding now to FIG. 9, an exemplary diagram of a hydrolysis and acidification system 310 suitable for implementation of hydrolysis and acidification process 300 is illustrated. In some embodiments, batch material produced by blend-heat process 200 could bypass hydrolysis and acidification system 310 through controllable, switchable valve 312; that is, batch material may proceed directly to FIFO anaerobic digestion process 400. Examples of such situations include, but are not limited to, where balancing of the materials load throughout ZW treatment process 1 is not needed; that is, no one individual process is overwhelmed with a material load. In some embodiments, recipes may not require an extended retention of the batch material prior to being subjected to FIFO anaerobic digestion process 400.

In some embodiments, the hydrolysis and acidification system 310 may need to be employed. Examples of such situations include, but are not limited to, the material load being routed through ZW treatment process 1 is unbalanced; that is, one of the individual processes may be causing a back-up for another process. In such cases, batch materials received from blend-heat process 200 may be diverted by switchable valve 312 to a hydrolysis-acidification tank 314 for holding until an unbalanced material load condition rectifies itself. In some embodiments, recipes may require an extended retention of the batch material prior to being subjected to FIFO anaerobic digestion process 400. In such cases, the batch material could be subjected to controlled agitation may be performed by a controllable mechanical agitator 316 and/or controllable fluidic jets 318. Material temperature could be monitored by the control system and, similar to blend-heat tanks 214 and 216, heat could be applied by one or more heat sources 320 and 322. In some embodiments, pH levels could be monitored and, as shown, a pH additive could be pumped into hydrolysis tank 314 (controllable pump not shown).

Figure 10:
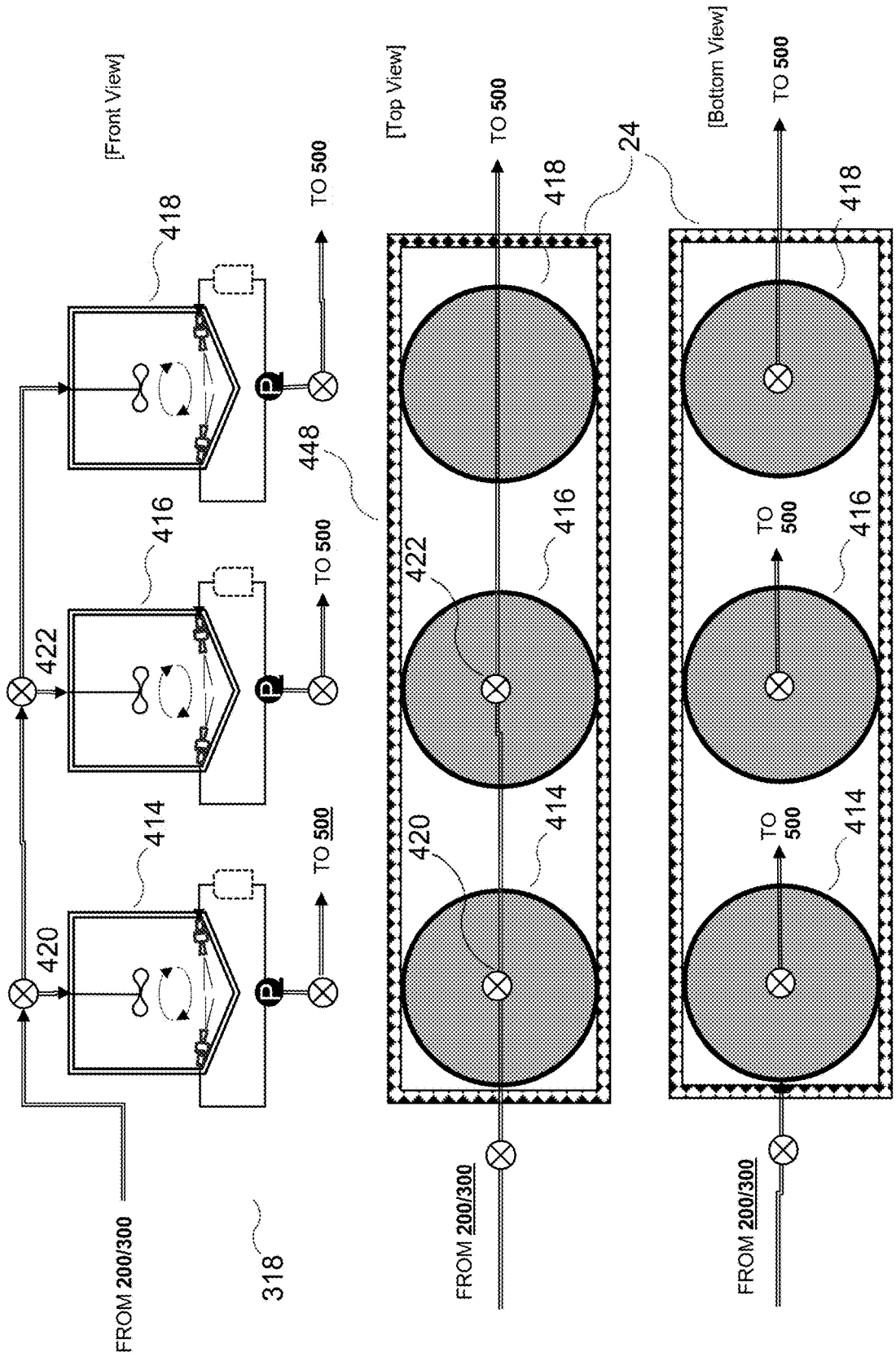
FIG. 10 illustrates exemplary vertical digesters of a first-in, first-out (FIFO) anaerobic digestion system, in accordance with some embodiments.

Referring now to FIG. 10, an exemplary diagram of a FIFO anaerobic digestion system 410 suitable for implementation of the FIFO anaerobic digestion process 400 is illustrated. In some embodiments, FIFO anaerobic digestion system 410 could include a vertical digester(s) 412 having one or more digester tanks 414, 416, and 418 configured to receive batch material produced from blend-heat process 200 and/or batch material subjected to hydrolysis and acidification process 300. In some embodiments, digester tanks 414, 416, and 418 may be similarly configured as hydrolysis-acidification tank 314. Through the control system, each digester tank 414, 416, and 418 may be filled with batch material through controllable selectable valves 420 and 422. To fill digester tank 414, selectable valve 420 could be positioned to direct batch material into digester tank 414 while simultaneously blocking off downstream flow to valve 422. To fill digester tank 416, selectable valves 420 and 422 may be simultaneously controlled: selectable valve 420 could be positioned to allow batch material to flow past digester tank 414 while simultaneously blocking off flow into it, and selectable valve 422 could be positioned to direct batch material into digester tank 416 while simultaneously blocking off downstream flow to digester tank 418. To fill digester tank 418, selectable valves 420 and 422 may be controlled: selectable valves 420 and 422 could be positioned to allow batch material to flow past digester tanks 414 and 416, respectively, while simultaneously blocking off flow into them, thereby allowing batch material to flow into digester tank 418. In some embodiments, digester tanks 414, 416, and 418 may be placed into enclosure 24.

Figure 11:
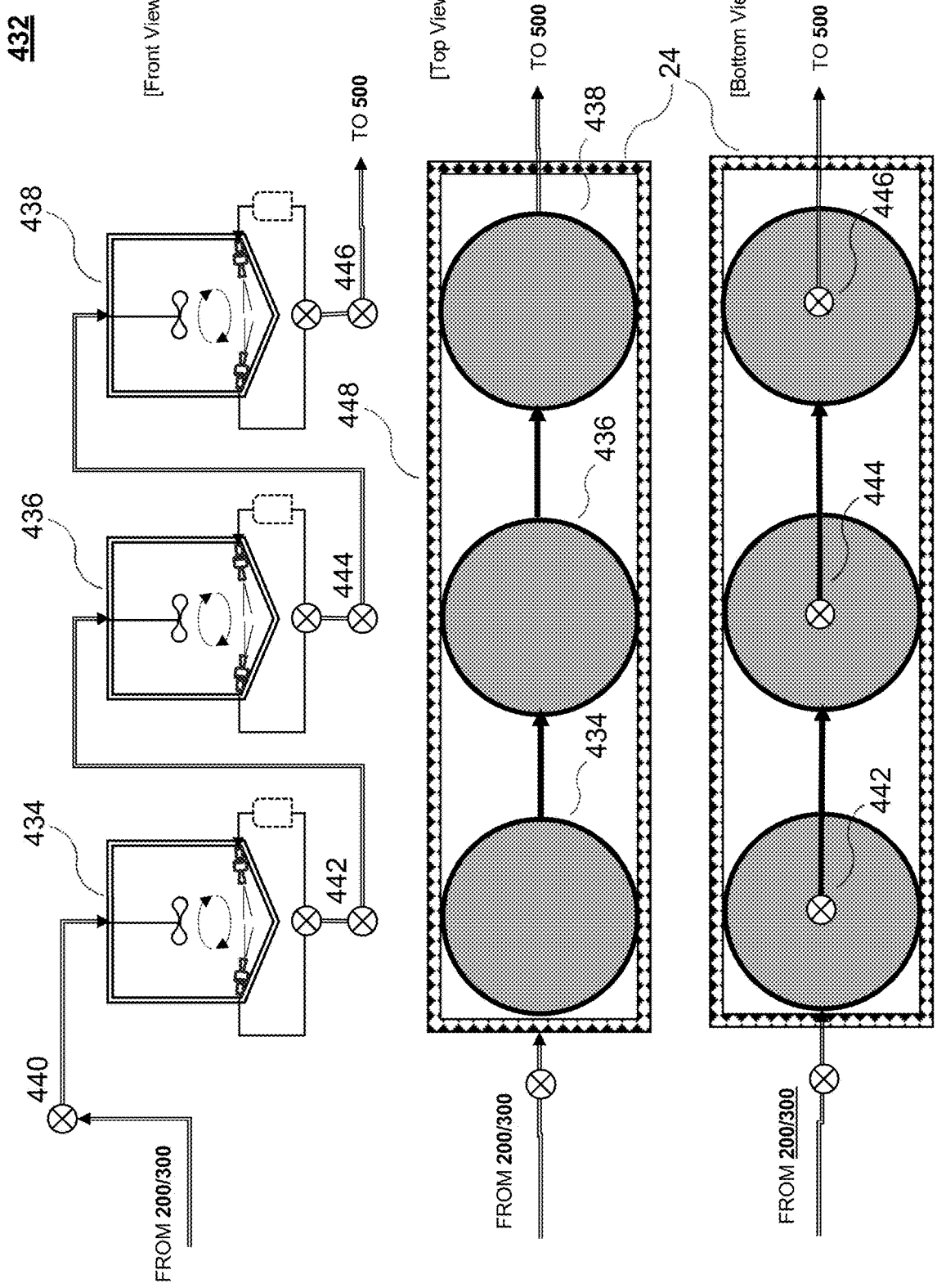
FIG. 11 illustrates exemplary first horizontal digesters of the FIFO anaerobic digestion system, in accordance with some embodiments.

Referring now to FIG. 11, FIFO anaerobic digestion system 410 could include a horizontal digester(s) 432 having one or more digester tanks 434, 436, and 438 configured to receive batch material produced from blend-heat process 200 and/or batch material subjected to hydrolysis and acidification process 300. In some embodiments, digester tanks 434, 436, and 438 may be similarly configured as hydrolysis-acidification tank 314. Through the control system, each digester tank 434, 436, and 438 may be filled with batch material through controllable selectable valves 440, 442, 444, and 446. When digester tank 434 is initially filled, selectable valve 440 may be opened to allow batch material to flow into it. When digester tank 436 is initially filled, selectable valve 442 may be opened to allow batch material to flow into it from digester tank 434, and selectable valve 444 may be opened to allow fresh batch material to flow into digester tank 434. When digester tank 438 is initially filled, selectable valve 444 may be opened to allow batch material to flow from digester tank 436 into digester tank 438, selectable valve 442 may be opened to allow batch material to flow from digester tank 434 into digester tank 436, and selectable valve 440 may be opened to allow batch material from blend-heat process 200 and/or batch material to flow into digester tank 434. When digestant is ready to be provided to aerobic boost-blend process 500, selectable valve 446 may be opened to allow batch material to flow from digester tank 438, selectable valve 444 may be opened to allow batch material to flow from digester tank 436 into digester tank 438, selectable valve 442 may be opened to allow batch material to flow from digester tank 434 into digester tank 436, and selectable valve 440 may be opened to allow batch material from blend-heat process 200 and/or batch material to flow into digester tank 434. In some embodiments, digester tanks 414, 416, and 418 may be placed into enclosure 24.

Figure 12:
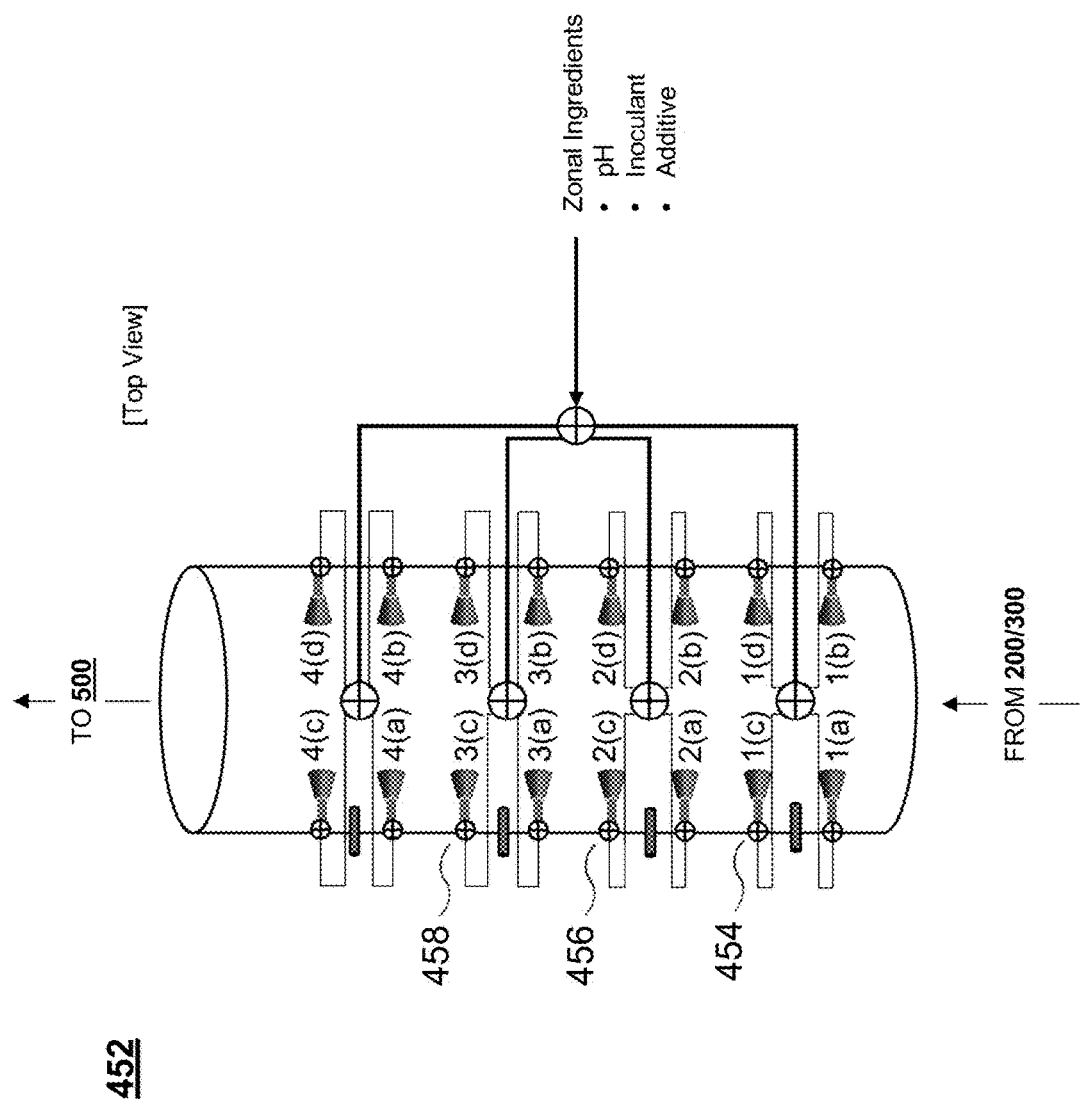
FIG. 12 illustrates an exemplary second horizontal digesters of the FIFO anaerobic digestion system, in accordance with some embodiments.

Referring now to FIG. 12, FIFO anaerobic digestion system 410 could include a horizontal digester(s) 452 having one or more digester zones divided by zone boundaries 454, 456, and 458 and configured to receive batch material produced from blend-heat process 200 and/or batch material subjected to hydrolysis and acidification process 300. As batch material is received, it flows through the digester zones. A first zone could include controllable fluidic jets 1(*a*) through 1(*d*). Similarly, second, third, and fourth zones could include controllable fluidic jets 2(*a*) through 2(*d*), 3(*a*) through 3(*d*), and 4(*a*) through 4(*d*), respectively. In some embodiments, fluidic jets 1(*a*) through 4(*d*) could be a source of agitation, heat, and/or injection device for a variety of ingredients required for the process including, but not limited to, those ingredients that are shown. In some embodiments, fluidic jets 1(*a*) through 4(*d*) could be sources of agitation, heat, and/or injection device of one or more zone ingredients as shown. In some embodiments, additional and/or alternative sources of heat may be incorporated per zone (not shown). In some embodiments, horizontal digester 452 could be placed by an enclosure configured to permit it to perform its digestive functions per recipe. In some embodiments, horizontal digester 452 may be placed into enclosure 24 (not shown).

The implementation of fluidic agitation within a horizontal format is illustrated to enable advanced functions for ZW treatments including one or more of the following: (a) zonal agitation with directional control variations via control of fluidic jets; (b) multi-zone inoculation using one or more inoculant sources within a ZW treatment facility; (c) multi-zone boosting by injecting volatile substrates to maintain carbon to nitrogen ratios and comply with organic standards (e.g., pretreated material) while maintaining and/or gradually cooling or heating internal temperature; and (d) fluidic zones that sample of temperature, material, and biochemical conditions with zonal adjustment of temperatures of zonal recirculation via in line heat exchange or other method from one or more heat sources. Fluidic agitation could enable secondary heating with monitoring and control of several biochemical parameters, such as pH, secondary inoculants, and thermal ingredients fed through fluidic agitation via jets. As fluids are drawn from a zone within the digester, they may be heated while integrity while maintaining integrity by either returning fluids to the same zone or propagating microbial culture by moving extracts backwards to an upstream zone.

With horizontal tanks, elevating the feed side may be preferred to allow for downhill material migration while maintaining plug flow integrity. However, the ability to support variable jet agitation rates and directions may reduce the need for significant elevation, increasing the control over material movement by using jet design to facilitate material migration. Using fixed jets that either alternate jet action to facilitate directional flows via alternating jet activity, may slightly forward directional jets and/or vary the flow rates of individual jets to slowly coax materials forward. Although not illustrated, a horizontal tank may have one or more jet-injector groupings with a switchable valves to choose which jets are operating at any one time, supported by one or more pumps with reversible flow control, one or more sensors for pH, temperature and other desirable parameters as well as one or more thermal injection or heat exchange heating to adjust internal temperature with one or more valves to control the rate of heating by zonal area, one or more pH injection and one or more downstream injection points for alternate/top off ingredients that can adjust pH and alternate ingredients.

Jet design variations with or without baffles and/or with or without mechanical agitation assistance may be necessary for increasing tank size and formats (e.g., round, oval, square or u-shape). Advantages of fluidic jet agitation include one or more of the following: (a) flexibility adjust agitation rates and directional characteristics to adapt from low to high solids loads with variable particle distribution; (b) sample temperature, pH, and other characteristics at many locations; (c) inject higher temperatures, pH adjustment materials as well as other fast digestion materials at one or more points to facilitate anaerobic digestion and thereby increase bioenergy production; (d) adjust intensity to initiate movement of materials to established consistent rotation and/or folding material flows; (e) pulse materials off the bottom to ensure solids remain in suspension; (f) alternate or adjust jets to facilitate migration; (g) adjust pressures and flow rates based on initially heavy yet reduced solids along the length of the digester; and (h) reverse flows, if needed. The above process may be calibrated with a fixed paddle and/or controlled with temporary paddle wheel with sensor that monitors internal rotations per minute, thereby allowing for the precise rotational control over independent zones.

Some of the advantages and benefits of FIFO anaerobic digestion process 400 include one or more of the following: (a) high solids with high destruction rate and orderly migration while minimizing settling; (b) support of multiple digesters, types/sizes/formats in sequential/parallel/mixed process flows; (c) enablement of an ability to control digester parameters throughout the tank per recipe requirements by batch of materials (i.e., multiple recipes in multiple digesters as well as an introduction of new recipes while minimizing degradation in microbial activity); (d) variable methods of agitation with variable agitation rates and directional characteristics to ensure material suspension and optimize anaerobic activity by zonal area; (e) an adjustment of biochemical conditions at multiple points within a digesters, either before, during, or after material migration; (f) thorough agitation while averting the risk of jamming between agitator and tank components; (g) proficient feeding of high-solids without a clogging of pipes or pumps; (h) self-cleaning digester operations that move materials towards evacuation and/or decanting ports; (i) an ability to add new materials at one or more points along zonal-FIFO progression; (j) an ability to control temperature, content, and agitation rates and flow direction at one or more points within digester tanks per recipe requirements and material composition within each zone; and/or (k) an ability to support multiple types of baffles at multiple locations within the digester to enable multiple baffle configurations via self-stabilizing, sliding, and/or securing connection points and connectors.

In some embodiments, FIFO anaerobic digestion process 400 may be performed through bio-methane and bio-hydrogen upgrading enhanced by fluidic agitation methods for thermal mixing. In some embodiments, thermal agitation vessels may be employed to maintain thermal conditions, monitor and adjust bio-chemical conditions per recipe instructions, agitate to keep materials in suspension, and propagate anaerobic culture to ensure thorough destruction, capturing, and cleaning biogas to produce bio-hydrogen, high density bio-methane, hydrogen-sulfide chemicals, and carbon dioxide effluent.

FIFO anaerobic digestion process 400 may be considered a distributed production process that is capable of ensuring organic and food safety requirements of multiple unique batches per day, in which the focus is thorough heating, destruction rate and time, using "orderly" material migration—i.e., FIFO. The process could avoid settleable solids build up and ensure precise temperature control with a consistent temperature throughout the vessels. Generally, smaller vessel size than bulk tank designs matched with thermal and biological persistence measures help to ensure consistent and effective treatment.

Figure 13:
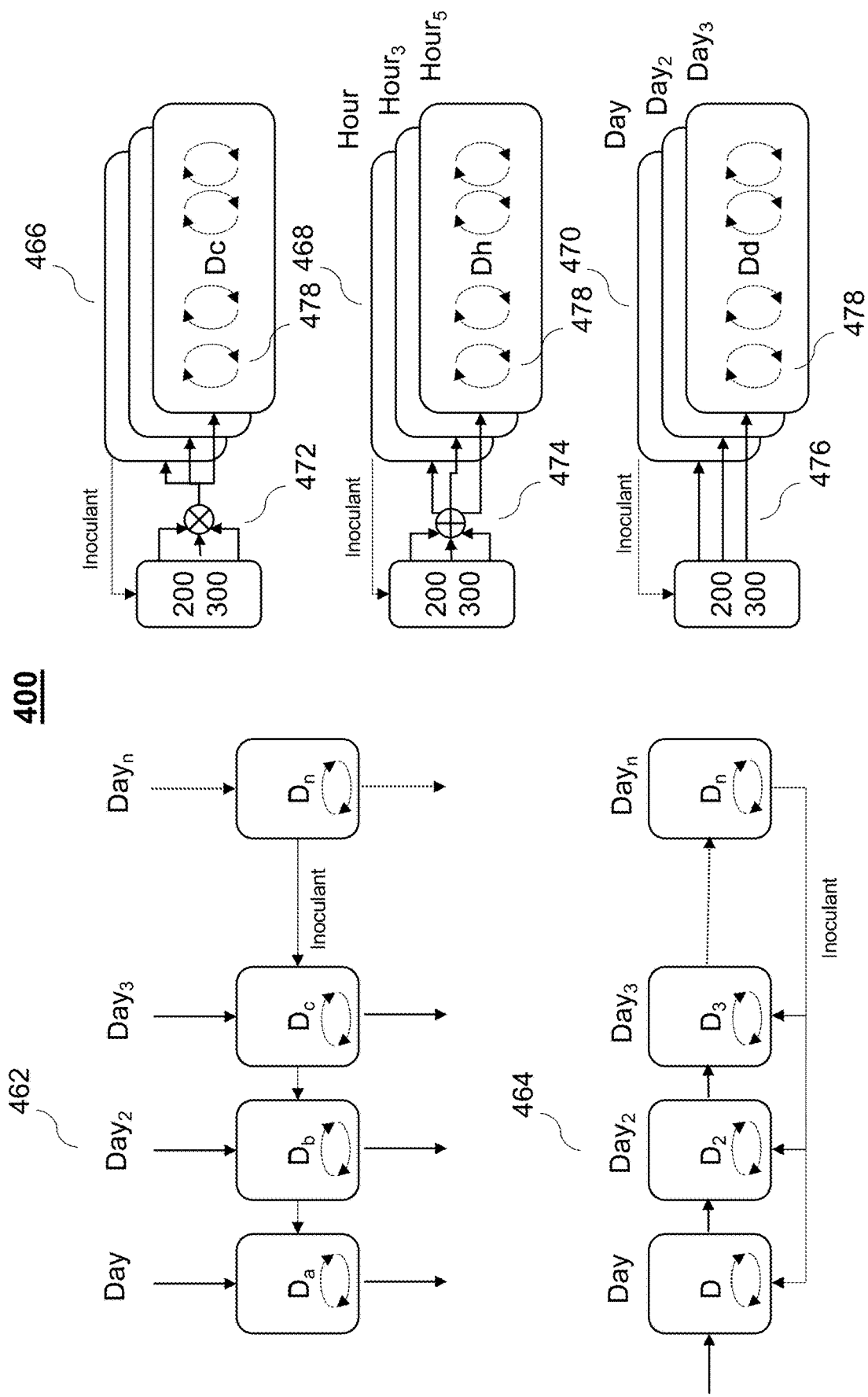
FIG. 13 illustrates exemplary multiple digester configurations, in accordance with some embodiments.

Referring now to FIG. 13, illustrate multiple digester configurations with a potential to comply with organic and food safety standards drawn towards time and temperature with orderly material migration are illustrated. Pluralities of vertical digesters 462 and 464 may be configured to comply with organic standards which could require thermophilic temperature with one or more processes for a minimum of three days. To facilitate microbial cultures, FIFO anaerobic tank subsystem 410 control of inoculant could cause a backwards migration of inoculant (as shown). For the purpose of illustration and not of limitation, vertical digesters 462 and 464 could be loaded every three or more days or hold materials in a sequence to maintain migration integrity by moving from one vessel to the next. If there are less than three digesters, organic loading could occur every three or more days to ensure that materials remain longer than three days. This design of vertical digesters 462 and 464 could support parallel loading of tanks every three days, totaling three days retention in at least one tank, or a sequential loading of one tank every three days, using the second tank as a second stage, thus totaling six days retention for two stages.

Pluralities of horizontal digesters 466, 468, and 470 could be configurable to comply with existing organic standards are illustrated. In some embodiments, as long as material integrity and migration of a plug flow is maintained at the required temperature throughout the vessel (e.g., a minimum of 4 days retention of materials), digestate could comply with organic standards. A number of enhancements could be used to allow existing digester designs to comply. These include the ability to load digesters in one or more sequences 472, 474, and 476 over time yet ensuring a minimum of three days retention per load, reducing tank size, sub-tank and/or internal heating with optimum control over agitation rates and direction, using through-chamber fluidic thermal agitation 428 as well as orderly and precise exchange of inoculants (as shown) from one or more zone within digesters to another digester. In some embodiments, digester designs may be combined in a sequence of either mesophilic/thermophilic, thermophilic/mesophilic, and/or with or without/pre- or post-pasteurization. This may be a necessary approach to enhance digester sites with concentrated thermophilic or pasteurization operations.

The preceding stages of the ZW process could provide improved recipe inputs, concentrate organic matter, remove and/or reduce problematic settleable solids such as, for example, sand from existing processes. The preceding steps may feed high solids recipes with very small organic matter.

At the time of this writing, existing organic standards within the United States require one-hundred thirty-one degrees Fahrenheit (thermophilic) treatment for a minimum of three days with orderly migration of organic materials in order to comply with periodic testing requirements and avoid food safety risks. Alternative treatments include pasteurization for sixty minutes; however, pasteurizing organic materials destroys anaerobic (i.e., digester) and beneficial soil bacteria, thereby reducing biogas release and nutrient efficiency of biofertilizers In some embodiments, ZW treatment process 1 may enable either compliance measure via pre-heating, batch digestion, and/or feedstock-specific heating; for example, an implementation of more stringent requirements for slaughterhouse byproducts. In some embodiments, ZW treatment process 1 enables higher levels of pathogen destruction while maintaining or propagating anaerobic culture for digestion as well as aerobic cultures for biofertilizers. As standards evolve, ZW treatment process 1 has built-in capabilities for adjustable destruction methods, thermal treatment and retention time by feedstock, batch type and/or stage of processing The ability to modify existing digesters and other related equipment could help to facilitate market scalability. Enhancements may be made to improve performance of bioenergy/biofertilizer production; however, as vessel size increases, it becomes increasingly difficult to ensure consistent temperature without increasing the rate of mixing. When agitation or mixing rates accelerate, anaerobic shock may occur from disturbances and/or cavitation (e.g., complete mix tanks). Hybrid heating treatment (e.g., thermophilic/mesophilic or mesophilic/thermophilic) within this design may rely on multiple tanks being arranged in sequence. This may be enabled via combinations of horizontal and/or vertical tanks as well as upgrading existing mesophilic sites to hybrid treatment to increase bioenergy production while producing organic grade biofertilizers.

ZW treatment process 1 enhancements over existing processes and common to both vertical and horizontal tank designs disclosed herein include one or more of the following: (a) smaller vessel size (typically below 100,000 gallons); (b) supporting variable temperature conditions among one or more digester vessels; (c) employing one or more methods with variable rates of agitation to maintain materials in suspension; (d) sub-tank, internal, and/or fluidic injection heating to ensure consistent temperatures and material suspension throughout the tank; and (e) multi-zone monitoring and control of anaerobic parameters such as ammonia, temperature, and pH.

In some embodiments, the ability to adjust material characteristics and control the rate and breadth of agitation, relative to material composition factors, could be essential for thorough destruction of diverse loads based upon unique recipe requirements.

Existing designs for vertical and horizontal systems may lack the ability to agitate to facilitate biological activity without experiencing challenges related to settleable solids or causing anaerobic shock. For instance, horizontal systems may experience buildup and temperature control problems as solids concentration increases and/or tank size becomes larger. Without fluidic agitation and multiple heat blankets, a long chamber with sub-heating source may lose external temperature as it proceeds downstream. A wide chamber may have sub-optimal temperature gradients within the tank. The ability to add thermal energy at multiple points could support consistent temperature control throughout horizontal designs of increasing length and diameter. Some existing designs include the use one heat blanket or multi-zone heat blankets distributed along the underbelly of the tank, both with slow mechanical agitation. For the former, temperature gradients may form within the heat blanket along a long tank as well as limited agitation control. For the latter, two temperature zones within a tank may form, resulting in temperature gradients from one zone to the next.

Some of the advantages and benefits of the ZW treatment digester design standards disclosed herein include maintaining consistent temperature within many configurations of tanks (e.g., larger and/or longer, curved and/or square sides), supporting moderate-to-high solids concentration via scalable heating, and agitation methods that are both complementary and controllable.

In some embodiments, one ZW treatment digester design standard could be associated with optional specialized baffles. The methods discussed above may be used with or without internal baffles, where the use may be dependent on the range of consistency, particles distribution, and solids concentration of expected organic loads. The ability to control baffle apertures and fluidic circulation rates based on the composition of organic materials could enable flexibility by recipe, particle distribution, material type, solids ratios, and direction in a variety of vessel formats, sizes, and shapes. Although not illustrated, an insulating baffle with controllable apertures could be used to support differentiated zonal heating.

In some embodiments, one ZW treatment digester design standard could be associated with biogas to biofuels and chemicals. Biofuel markets may require upgrading of biogas to higher grades of near pure biomethane and biohydrogen. The ability to control feedstock, optimize materials, and maximize thermophilic destruction may maximize methane ratio within raw biogas. Higher quality biogas from greater volume of bioenergy could reduce the cost and complexity of upgrading biogas to biomethane. The gas treatment subsystem functions of the embodiments disclosed herein are illustrated and described below.

Figure 14:
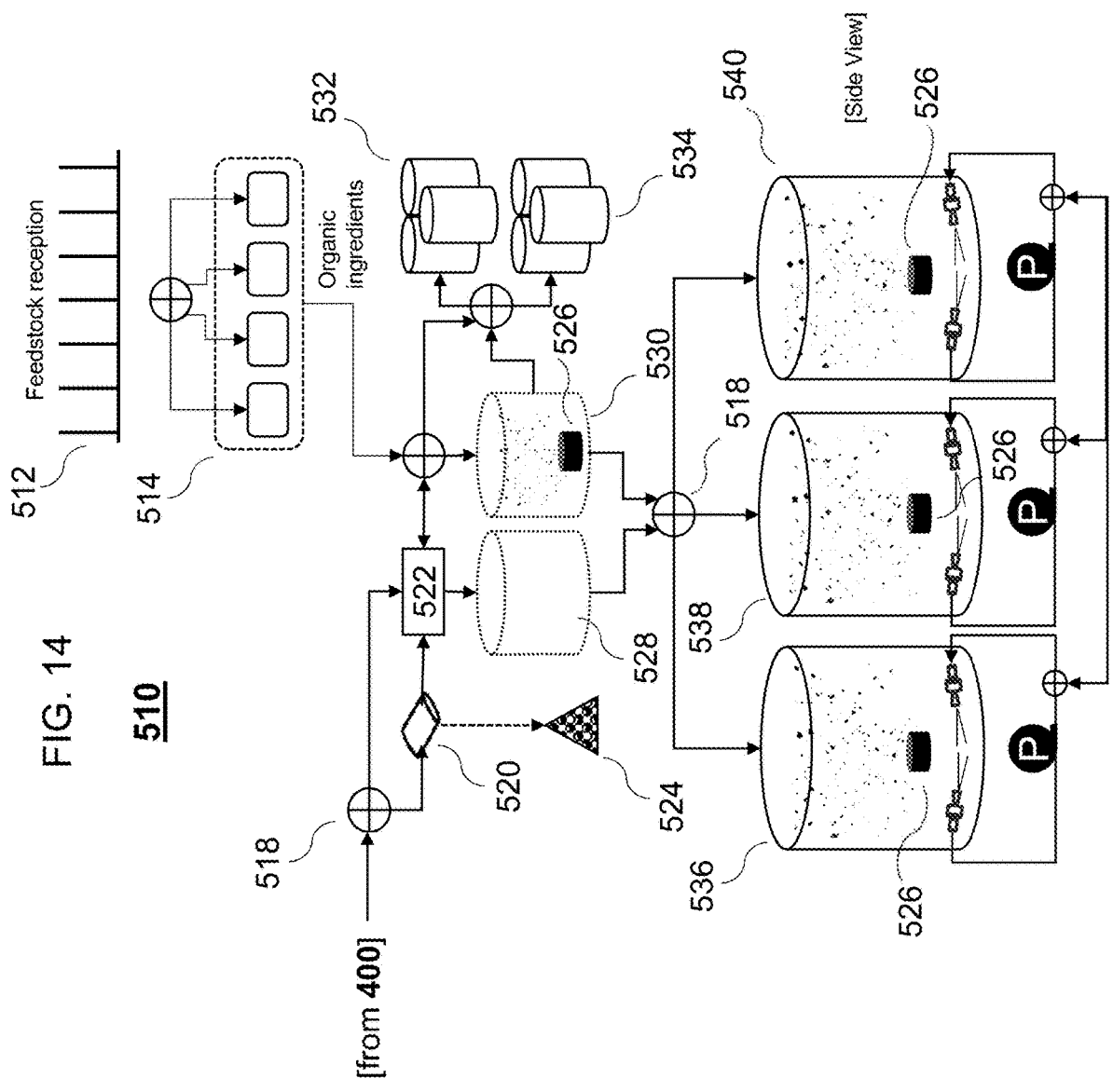
FIG. 14 illustrates an exemplary aerobic boost-blend system, in accordance with some embodiments.

Referring now to FIG. 14, an exemplary diagram of an aerobic boost-blend system 510 suitable for implementation of aerobic boost-blend process 500 is illustrated. A selection of individual processing methods is illustrated to support variable treatment and blending of organic mediums for anaerobic and/or aerobic composition. Similar to the controllable feedstock pretreatment system 212 discussed above, various feedstocks may be received 512 in the aerobic boost-blend process 500 for use in organic refining, aerobic propagation, and integration processes. Various pretreatments 514 may be applied on-site or at remote site away from a ZW facility including purpose-grown feedstock production, drying, biochar, brewing, chopping, grinding, milling, composting and/or verm icom posting (worm castings), photobioreactor, microbial fuel cell, extraction, and/or other methods that produce or refine organic materials into a variety of ingredients with desirable characteristics. Digestate produced by FIFO anaerobic tank process 400 may be routed via controllable, switchable valve 518 for screening/pressing 520 and/or filtering 522 to the desired particle distribution range, extracting macro solids for mulch and/or crop dressings 524 and/or subjected to sonic destruction or other methods to convert macro particles into micro particle distribution that supports various delivery methods such as drip, spray, or mist applications. In some embodiments, a controllable aerator 526 and/or controllable sonic destructors (not shown) may be added to any holding tank 528, 530, 532, 534, 536, 538, and 540 for subsequent processing. Since the digestate has been heated to thermophilic temperatures, these source mediums could provide heat for any blend, brew, and/or extract process. Conversely, water and/or cool mediums may be used to regulate temperatures via blending and/or heat exchange.

Some of the advantages and benefits of aerobic boost-blend process 500 include one or more of the following: (a) an ability to produce multiple formulas and grades of organically compliant mediums that support the full scope of agronomic feeding methods including aquaponics, aquaculture, mulch-tilling, mulch-injection, crop dressings, sprays, drips, foliar mists, and natural pest control; (b) an ability remove or destroy large solids that might clog irrigation equipment; (c) an ability to produce aerobic inoculants and compost teas; (d) an ability to enhance digestate with inoculants, nutrient-adders, blends, concentrates, micro solids, enzymes, and other booster-adder values; (e) an ability to concentrate organic medium into storable-shippable-hydratable formats that increase value while adapting to seasonal demand and user preferences; (f) an ability to convert anaerobic mediums to aerobic mediums via aeration, heating, chemically-motivated oxygen producers and/or inoculant adders; (g) an ability to optimize for various grades by batch treatment and/or adder mediums; and (h) an ability to use specialized feedstocks that add desirable characteristics that satisfy buyers, such as enzymes, worm castings, biochar, humic/fulvic acids, leafy compost, woody compost, and/or other materials Aerobic boost-blend process 500 performs several functions that may include the following: (a) processing aerobic feedstocks and mediums; (b) separating wide particle distribution mediums into multiple grades of material; (c) converting anaerobic mediums to aerobic; (d) blending mediums and ingredients to achieve formulaic objectives by product; (e) preparing and holding bioactive mediums for delivery [e] producing inoculants and/or activator mediums; and (f) concentrating and/or converting mediums for storage and/or long range shipping.

Biofertilizers with concentrated micro particles of fresh organic matter (micro-FOM) could stimulate beneficial microbial activity within soils. Although a pretreatment of anaerobic materials with sonic destruction may be beneficial, digested mediums and aerobic materials may require further treatment. Alternatively, the operator may choose to digest with larger particles for certain biosolids production options (e.g., mulch production).

Figure 15:
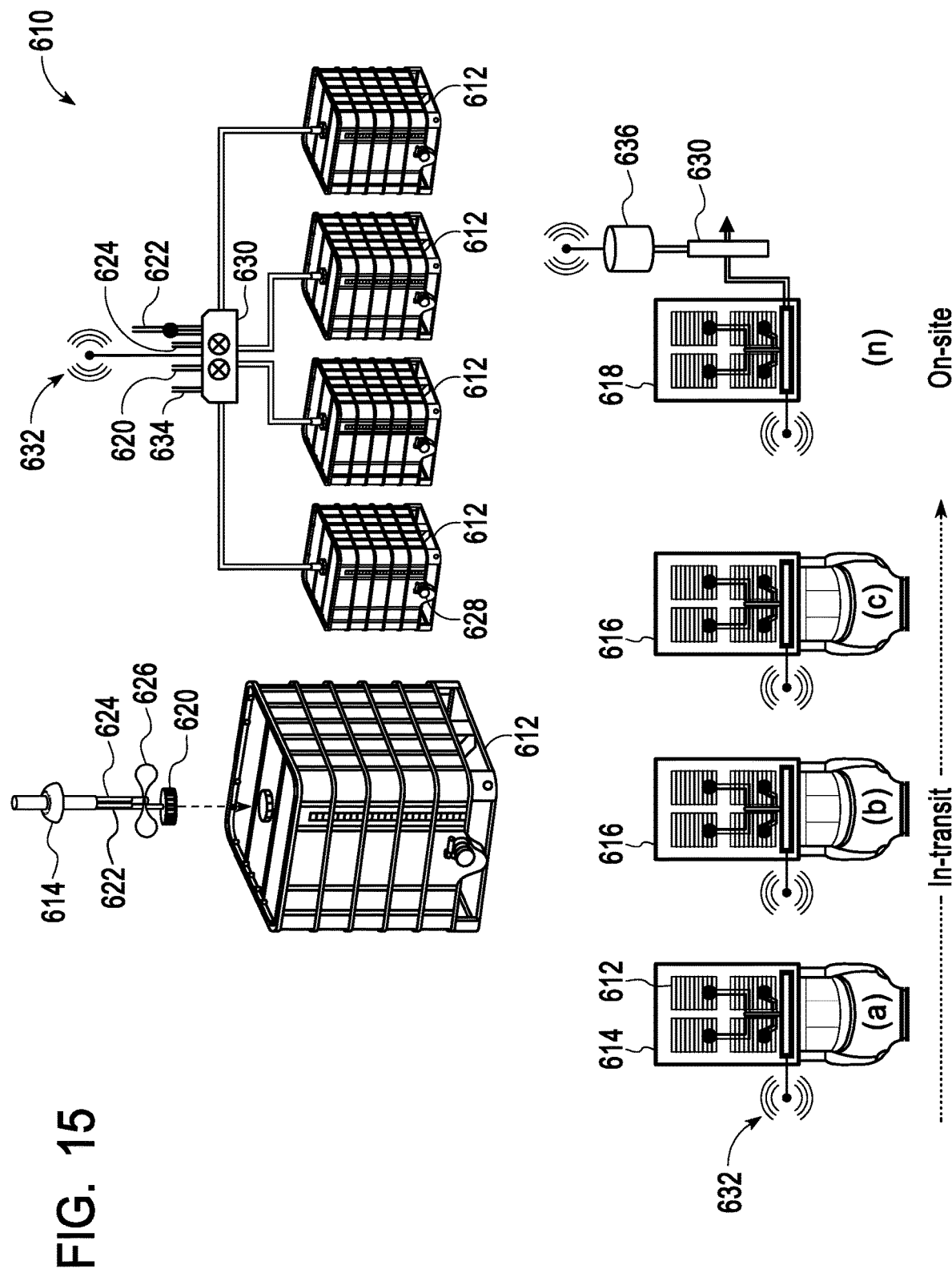
FIG. 15 illustrates an exemplary smart delivery system, in accordance with some embodiments.

Referring now to FIG. 15, an exemplary diagram of a smart delivery system 610 suitable for implementation of smart delivery process 600 is illustrated. Examples and processes are presented to illustrate that the transport side of delivery may be integrated with just-in-time application intelligence at various delivery locations supporting variable nutrient applications across many crop areas at each location.

Smart delivery system 600 could include product containers 612.Formulaic metering-blending 614 may be integrated into a mobile tank system 616, a drop-off/changeout tank system (not shown), and/or fixed on-site tank systems 618. Formulas may be delivered via multiple transport methods or mobile systems 616 that enable smart nutrient-irrigation services. In some embodiments, a device may be configured to share multiple functions such as, but not limited to, aeration 620, fluidic recirculation 622, heating 624, and/or agitation drive 626 among product containers 612, each with a tap 628 for delivering the medium. A control system 630 could include wireless communications 632 with controls of aeration 620, fluidic recirculation 622, heating elements 624, and ingredient and/or microbial inoculant 634. In some embodiments, dedicated tank level monitoring systems 636 may be retrofitted to existing storage systems.

In some embodiments, a heat exchanger may interface with the exhaust of the vehicle for moderate heating requirements. In some embodiments, additional equipment such as, but not limited to, inoculant tanks and/or on-board brewer for delivering or exchanging activated biological characteristics in transit, filter-pump for extracting mediums for final delivery, sensor/quality control items (e.g. pH), and/or smaller adder tanks for any last-minute adjustments are supported by smart delivery process 600.

In some embodiments, delivery methods include tanker-trucks, multi-container flatbed trucks, smart-tank changeout, aerating containers for maintaining or propagating aerobic microbial cultures in transit, and smart nutrient irrigation services which entail many variations including, but not limited to, jet sprayer tanks for roadway and golf courses. In some embodiments, intensive soil recovery and turnkey crop control services may integrate with sensor-enabled soil/crop monitoring telemetry networks and micro irrigation controls. In some embodiments, smart tanks may blend-activate mediums per the crop area and growth stage requirements. For instance, the ratio of nutrients, micro solids, and microbial characteristics may vary based on weather, soil, growth stage and market demand (i.e., price signals). One area may benefit from bio stimulant characteristics such as on-site brewer that activates soil biology within the medium as applied. Based on soil tests, another crop area may require no biostimulant, yet may benefit from increasing the ratios of fresh organic matter as well as adjusting potassium and calcium content before harvest.

A group of containers or tanks may be combined in a transportable jig to drop off the same functions as an intelligent tank that interfaces with irrigation equipment. In some embodiments, an intelligent controller with communications monitors and/or controls the tank as well as communicates with smart irrigation and/or crop monitoring and control systems. Under this approach, delivered assets are able to adjust the ratios of blends/characteristics as well as dilution rates based on the crop-feeding regimens. Greenhouses, landscaping and non-soil applications such as aquaculture, aquaponics, algae ponds and photobioreactors for algal biofuel facilities are also capable of being monitored and/or controlled. A solar canopy with or without canvas draping sides may be added to this configuration to provide power at remote that are remote from power connections.

There may be many forms of bioenergy and chemicals variations from the ZW treatment process 1 with many ways to deliver fuels and chemicals, each with specific regulations and logistics. Leveraging the value of multiple fuel and chemical types with controllable content may imply a delivery capability that respond to dynamic market conditions of various uses, such as commercial and industrial users, gas reformers, locational biofuel storage with or without power dispatch services, plastics producers, medical industries, nitrogen-fixation producers, remote power applications, transportation refueling stations and utilities pipelines.

When delivered to a pipeline, insertion content may be required to comply with existing utility standards. However, on-site insertion of renewable natural gas (RNG) may have different logistics than virtual pipeline (remote insertion using compressed renewable natural gas (R-CNG) or long-range shipping, typically liquefied renewable natural gas (R-LNG) or fuel conversion (e.g. biodiesel). In some embodiments, direct delivery of R-CNG may be an option. In some embodiments, biohydrogen may have its own methods of delivery. In some embodiments, liquefied carbon dioxide and hydrogen sulfide have a variety of end-uses as well.

Figure 16:
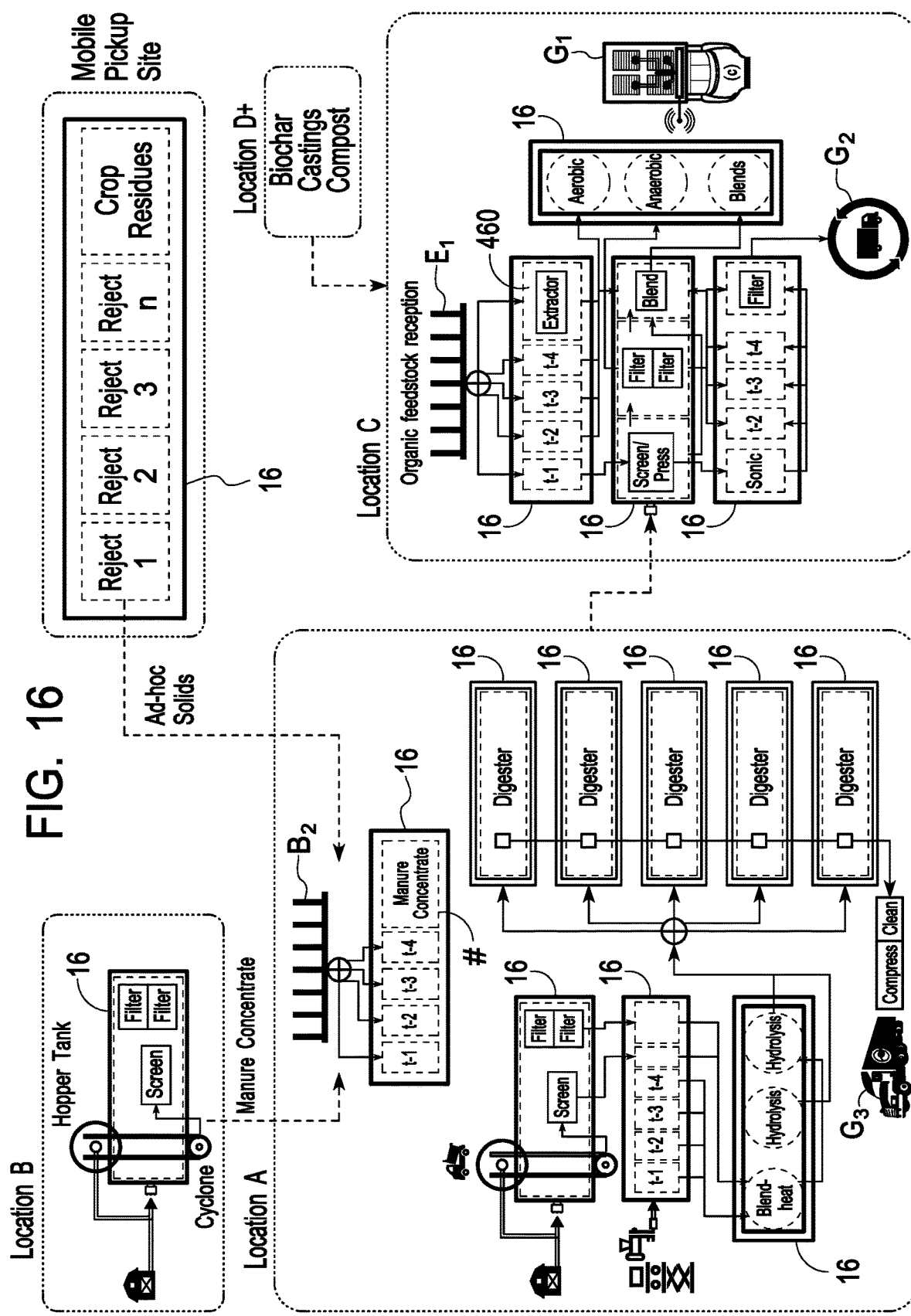
FIG. 16 illustrates an exemplar of the embodiments disclosed herein, in accordance with some embodiments.

Referring now to FIG. 16, some advantages of some of the disclosed herein are presented to illustrate one possible configuration of interconnectivity between multiple locations so that the locations may each work together to remediate waste streams and maximize bioenergy and biofertilizer production with a plurality of modular containers 16, where within each there may be one or more enclosures shown by dashed lines inside the modular containers 16. In some embodiments, a mobile pick up system could receive material near the harvest that is then transported to one or more ZW treatment sites (Location A). In some embodiments, a remote wastewater concentration facility could extract manure solids from one or more nearby livestock sites (Location B), transporting materials via pipeline or truck. In some embodiments, Location A operates as the remediation and biofuel production facility implementing stratification and extraction, blend-heat, hydrolysis and acidification, and FIFO anaerobic digestion processes 100-400, respectively, with smart bioenergy delivery pickup (G3) that could deliver to an insertion point and/or one or more customer locations. In some embodiments, organically-compliant digestate may be piped or transported to one or more organic treatment sites (Location C) where aerobic boost-blend process 500 supply precise organic mediums to smart delivery systems (G1 and G2) that activate and adjusts formulas per the needs of each delivery location. In some embodiments, specialized pretreatment of various organic ingredients may be prepared at one or more additional sites (Location D+).

As used herein, the term "embodiment" means an embodiment that serves to illustrate by way of example but not limitation.

It will be appreciated to those skilled in the art that the preceding examples and embodiments are exemplary and not limiting to the scope of the inventive concepts disclosed herein. It is intended that all modifications, permutations, enhancements, equivalents, and improvements thereto that are apparent to those skilled in the art upon a reading of the specification and a study of the drawings are included within the true spirit and scope of the inventive concepts disclosed herein. It is therefore intended that the following appended claims include all such modifications, permutations, enhancements, equivalents, and improvements falling within the true spirit and scope of the inventive concepts disclosed herein.

What is claimed is:

1. A wastewater separation and extraction system, comprising:
   a tank comprised of at least one feed port and a plurality of siphon ports, where the at least one feed port is configured to receive liquid waste material;
   a first siphon port of the plurality of siphon ports through which a stream of settleable solids is removed from the bottom of the tank and subjected to a first extracting device configured to extract inorganic solids from the settleable solids and a second extraction device configured to extract first organic solids;

a second siphon port of the plurality of siphon ports, located above the first siphon port, through which a stream of solids suspended in the liquid waste material is removed from the tank and subjected to a third extracting device configured to extract second organic solids; and a third siphon port of the plurality of siphon ports, located above the second siphon port, through which a stream of solids buoyant on the liquid waste material is removed from the tank and subjected to a fourth extracting device configured to extract third organic solids.

2. The system of claim 1, wherein the tank is further comprised of a return port configured to receive from the second extracting device a stream of material other than the first organic solids extracted by the second extracting device.

3. The system of claim 1, wherein the tank is further comprised of an overflow port.

4. The system of claim 1, wherein a fifth extracting device is configured to extract filtered water from streams of materials received from the third and fourth extracting devices other than the second and third organic solids, respectively.

5. The system of claim 1, wherein the tank has a first side and an opposing second side elevated above the first side, and the first second, and third siphon ports are located on the first side of a tank.

6. The system of claim 1, wherein each one of the first, second, and third extracted organic material is provided to a first, second, and third holding tank, respectively.

* * * * *